United States Patent [19]
Marino

[11] Patent Number: 5,892,575
[45] Date of Patent: Apr. 6, 1999

[54] METHOD AND APPARATUS FOR IMAGING A SCENE USING A LIGHT DETECTOR OPERATING IN NON-LINEAR GEIGER-MODE

[75] Inventor: Richard M. Marino, Kwajalein, Marshall Islands

[73] Assignee: Massachusetts Institute of Technology, Cambridge, Mass.

[21] Appl. No.: 644,301

[22] Filed: May 10, 1996

[51] Int. Cl.[6] ............................... G01C 3/08
[52] U.S. Cl. ............... 356/5.01; 356/141.4; 356/141.5
[58] Field of Search ................ 356/141.1, 141.4, 356/141.5, 5.01–5.09

[56] References Cited

U.S. PATENT DOCUMENTS 5,056,914 10/1991 Kollodge ........................ 356/5
5,682,229 10/1997 Wangler ..................... 356/141.1 X

OTHER PUBLICATIONS

Melngailis, I. et al., "Laser Radar Component Technology", *Proceedings of the IEEE*, vol. 84, No. 2, pp. 227–267, (Feb. 1996).

Kamerman, G.W., "Laser Radar Signals the Civilian Sector", *Laser Focus World*, pp. 81–87, (Apr. 1996).

Marino, R.M. et al., "A 3D Imaging Seeker With a Photon–Counting Laser Radar (U)", 12 pages, (Oct. 1992).

Marino, R.M. et al., "A Photon–Counting 3–D Imaging Laser Radar For Advanced Discriminating Interceptor Seekers", pp. 1–3, (Jun. 1993).

Marino, R.M. et al., "Laboratory Test Results of 4×4 Geiger–Mode Avalanche Photodiode Detector Arrays from Radiation Monitoring Devices (RMD)", pp. 2–5, (Aug. 11, 1995).

Youmans, D.G., "Avalanche Photodiode Detection Statistics for Direct Detection Laser Radar", *SPIE Proceedings*, vol. 1633, Laser Radar VII: Advanced Technology for Applications (1992).

Marino, R.M. et al., "A 3D Imaging Laser Radar with Photonic Sensitivity (U)", pp. 2–9, (May 14, 1996).

*Primary Examiner*—Joseph L. Felber
*Attorney, Agent, or Firm*—Testa, Hurwitz & Thibeault, LLP

[57] ABSTRACT

A method and apparatus for imaging a scene. The method and apparatus are capable of resolving 3D spatial structure within the scene. The apparatus includes a light source, a timing system and a detector system. The light source emits pulses of light toward the object or target scene being imaged. In one embodiment, the light source is a laser. In another embodiment, the detector system includes an optical system and a monolithic array of light detectors operating in non-linear Geiger-mode. The optical system collects a portion of the light scattered off of objects in the target scene and directs the collected light toward the array of light detectors. In another embodiment, the detector system includes an optical system and a single light detector operating in non-linear Geiger-mode. In this embodiment, the optical system scans the target scene, collects a portion of the light scattered off of objects in the target scene and directs the collected light toward the light detector.

23 Claims, 30 Drawing Sheets

TYPICAL GEIGER-MODE TTL OUTPUT PULSE FROM SINGLE PHOTON DETECTION USING THE MIT-1 DETECTOR MODULE (DEVELOPED BY EG&G/CANADA).

TYPICAL RAW GEIGER-MODE APD OUTPUT PULSES FROM ONE OF THE 20 μm RMD DETECTORS FOR FOUR VALUES OF BIAS VOLTAGE.

DARK COUNT RATE VS CASE TEMPERATURE FOR THREE VALUES OF BIAS VOLTAGE (RMD PACKAGE #1).

SINGLE PHOTON RANGING HISTOGRAM WITH A 3% PROBABILITY OF DETECTION ($T_{case}$ = -20°C, $V_b$ = 1.08 $V_{br}$).

MANY PHOTON RANGING HISTOGRAM WITH A 95% PROBABILITY OF DETECTION ($T_{case}$ = -20°C, $V_b$ = 1.08 $V_{br}$).

SINGLE FRAME 3D IMAGES OF SPHERICAL
WEATHER BALLOON WITH THREE LEVELS
OF TRANSMITTER ATTENUATION

| FIG. 13A | |
|---|---|
| FIG. 13B | FIG. 13C |

REL. ATTENUATION = 10 dB $P_d \sim 0.36$, $N_{ph/pix} \sim 0.58$, $N_{ph\_tot} \sim 183$.

REL. ATTENUATION = 5.dB $P_d \sim 0.36$, $N_{ph/pix} \sim 1.3$, $N_{ph\_tot} \sim 413$.

SINGLE FRAME AND THREE-COMBINED
3D IMAGES OF CONE AT ASPECT
ANGLES OF 0, 45, AND 90 DEGREES

| FIG. 14A | FIG. 14C |
| FIG. 14B | FIG. 14D |
| FIG. 14E | FIG. 14G |
| FIG. 14F | FIG. 14H |
| FIG. 14I | FIG. 14K |
| FIG. 14J | FIG. 14L |

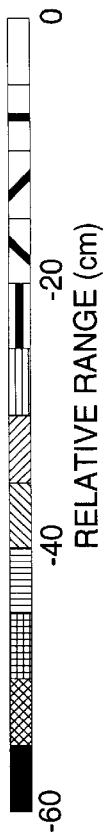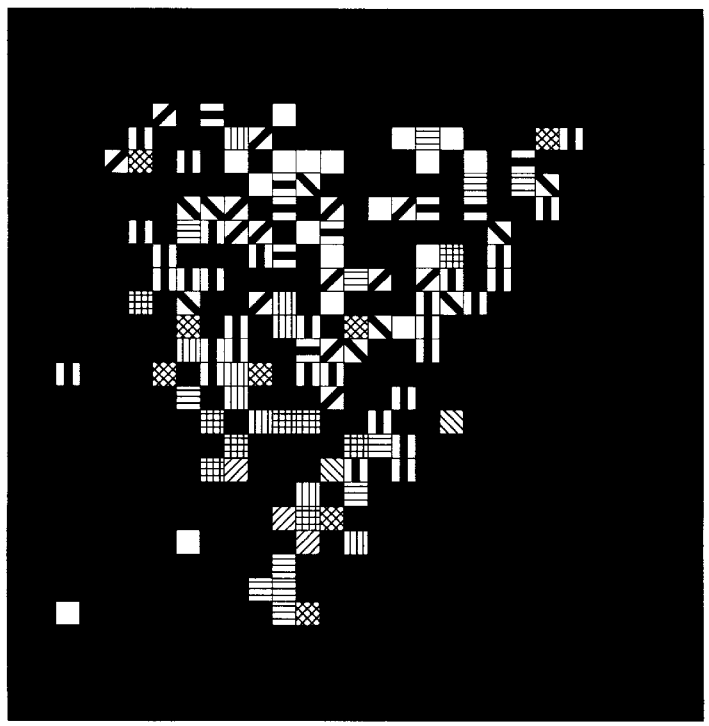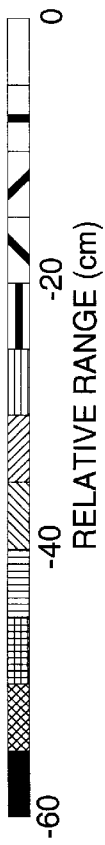
FIG. 14L
FIG. 14K

SINGLE FRAME AND THREE-COMBINED 3D
IMAGES OF CONE AT ASPECT ANGLES OF
45, AND 90 DEGREES WITH TRANSMIT
ATTENUATION OF 5 DB

| FIG. 15A | FIG. 15C |
|---|---|
| FIG. 15B | FIG. 15D |
| FIG. 15E | FIG. 15G |
| FIG. 15F | FIG. 15H |

$P_d \sim 0.21$, $N_{ph/pix} \sim 0.67$, $N_{ph\_tot} \sim 176$ $P_d \sim 0.16$, $N_{ph/pix} \sim 0.51$, $N_{ph\_tot} \sim 134$

AVE OF FIGURES 15A-C

ASPECT = 45 deg

RELATIVE RANGE (cm)

$P_d \sim 0.24$, $N_{ph/pix} \sim 0.79$, $N_{ph\_tot} \sim 206$

RELATIVE RANGE (cm)

$P_d \sim 0.18$, $N_{ph/pix} \sim 0.59$, $N_{ph\_tot} \sim 145$ $P_d \sim 0.18$, $N_{ph/pix} \sim 0.57$, $N_{ph\_tot} \sim 141$

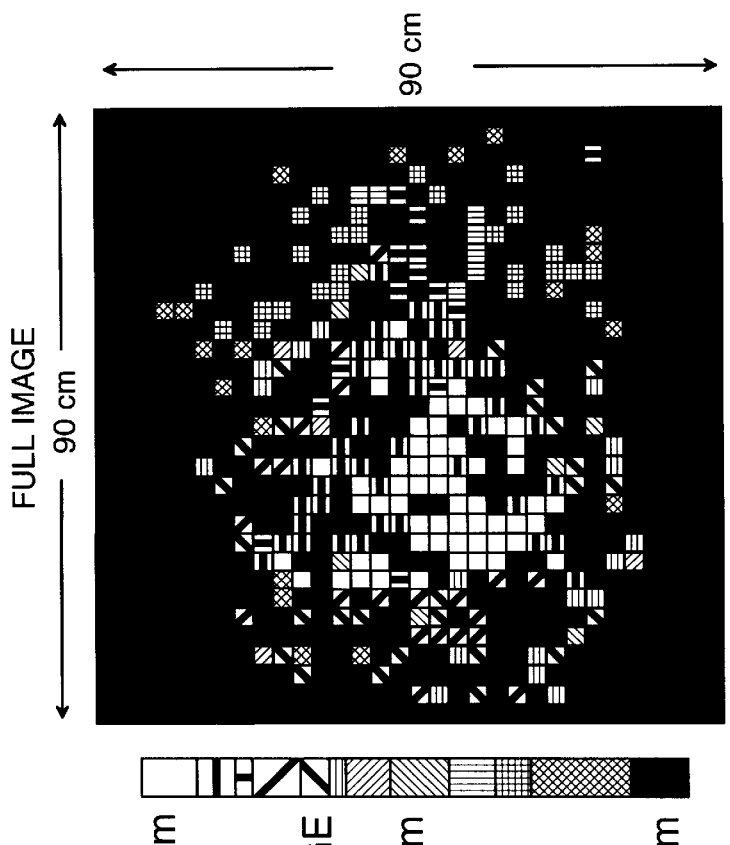
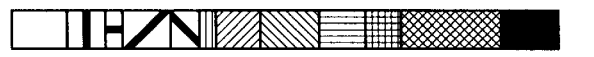
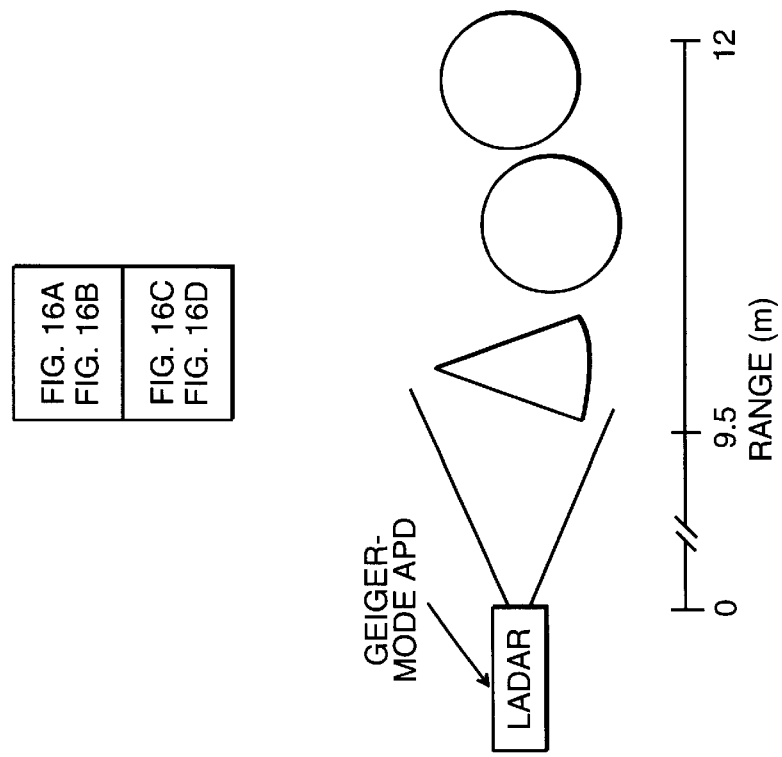
LADAR ANGLE-ANGLE-RANGE IMAGES
(700 SIGNAL PHOTONS)
3D IMAGES OF TARGET SET (ONE CONE AND TWO SPHERES) WITH ROUGHLY 700 TOTAL SIGNAL PHOTONS RECEIVED
| FIG. 16A | FIG. 16B |
| FIG. 16C | FIG. 16D |
FIG. 16B
FIG. 16A LADAR ANGLE-ANGLE-RANGE IMAGES
(7000 SIGNAL PHOTONS)
3D IMAGES OF TARGET SET (ONE CONE AND TWO SPHERES) WITH ROUGHLY 7000 TOTAL SIGNAL PHOTONS RECEIVED

| FIG. 17A | FIG. 17B |
| FIG. 17C | FIG. 17D |

COMPARISON OF ANGLE-ANGLE-RANGE (3D) AND ANGLE-ANGLE-INTENSITY (2D) IMAGES OF TARGET SET (NORMALIZED TO IDENTICAL QUANTUM EFFICIENCIES)

| FIG. 18A | FIG. 18B |
|---|---|
| FIG. 18C | FIG. 18D |

GEIGER-MODE APD IMAGE
7,000 SIGNAL PHOTONS 9.5m — RANGE — 10.5m — 11.5m

COOLED CCD IMAGE
70,000 SIGNAL PHOTONS

INTENSITY

METHOD AND APPARATUS FOR IMAGING A SCENE USING A LIGHT DETECTOR OPERATING IN NON-LINEAR GEIGER-MODE

STATEMENT REGARDING FEDERALLY SPONSORED RESEARCH

This invention was made with government support under Contract No. F19628-95-C-002 awarded by the Department of the Air Force. The government may have certain rights in the invention.

FIELD OF THE INVENTION

The invention relates generally to a method and apparatus for imaging a scene using laser radar. More specifically, the invention relates to a method and apparatus which use a laser radar system having a light detector operating in non-linear Geiger-mode to image a scene.

BACKGROUND OF THE INVENTION

Most remote imaging techniques can be broadly divided into two categories: passive and active. As used herein, "imaging" is defined as creating a representation of a scene. Passive imaging techniques detect light emitted or reflected by objects. Passive imaging techniques can be used to recognize objects if the reflective or emissive signature of the objects can be distinguished from sensor noise and background light. As used herein, an object's "signature" is defined as the appearance of the object. A camera is an example of a device which uses a passive imaging technique.

Active imaging techniques direct light onto a target scene and detect light reflected back from objects in the target scene. As used herein, "target scene" is defined as the region in space to be imaged. Similar to passive imaging techniques, active imaging techniques can be used to recognize objects within the target scene if the reflective or emissive signature of the objects can be distinguished from sensor noise and background light. The problem of recognizing an object using remote imaging techniques is complicated because the signature of an object varies with surface, lighting, environmental conditions, viewing angle and percent exposure.

Laser radar, also referred to as Light Detection and Ranging (LIDAR) or Laser Detection and Ranging (LADAR), is an active imaging technique which utilizes a laser in a radar system configuration to remotely image a target scene. Laser radar systems utilize principles of optics and microwave radar. Conventional laser radar systems are able to measure the shape, position, and velocity of objects in a target scene. Other known laser radar systems include coaxial passive thermal sensing receivers which measure the temperature of objects in the target scene.

Conventional laser radar systems can be broadly divided into two categories: scanning and scannerless. Typical scanning laser radar systems include a laser, scanning optics, a timing system, a detector system and a processor. The detector system includes a light detector. To image a target scene, a typical scanning laser radar system first transmits a short pulse of light toward a point in the scene. In one known system, the pulse of light has a duration of approximately one nanosecond. Next, the detector system detects light reflected back from the point in the scene and the timing system determines the round-trip travel time of the pulse of light. As used herein, the "roundtrip travel time" of a pulse of light is defined as the amount of time between the time that the laser transmits the pulse of light and the time that the detector system detects the reflected light. Next, the processor records the direction of the output of the laser and the round-trip travel time of the pulse of light. The scanning optics then position the output of the laser toward a new point in the target scene and the laser radar system transmits a second pulse. This process is repeated for each point in the target scene. Finally, the processor generates an image of the scene in response to the recorded directions of the output of the laser and the corresponding round-trip travel times of each of the transmitted pulses of light.

Typical scannerless laser radar systems include a laser, a timing system, a stationary detector system and a processor. The detector system includes an array of light detectors. To image a target scene, a typical scannerless laser radar system directs the output of the laser toward the target scene and the laser transmits a pulse of light toward the target scene which illuminates the entire scene. Next, the detector system detects light reflected back from the scene. The timing system then determines a roundtrip travel time of the pulse of light for each of the light detectors in the array that detects reflected light. Next, the processor records the positions of the light detectors in the array that detected the reflected light and the corresponding round-trip travel times of the pulse of light for each light detector. Finally, the processor determines an image of the target scene in response to the recorded positions of the light detectors and corresponding round-trip travel times of the transmitted pulse of light.

In general, known laser radar systems are subject to one of the following shortcomings: being heavy and large in size; having cryogenic cooling requirements; having high false alarm rates; having poor ranging precision; and not being capable of single photon detection. Known scannerless laser radar systems have the additional shortcoming of crosstalk between the light detectors in the array of light detectors.

What is desired then is a light-weight direct detection laser radar system which can measure and image the three-dimensional spatial structure of objects located in a target scene with extreme sensitivity. The present invention permits such functionality.

SUMMARY OF THE INVENTION

The invention relates to method and apparatus for measuring and imaging a scene using a laser radar system. More specifically, the invention relates to a method and apparatus which use a laser radar system having a light detector operating in nonlinear Geiger-mode to image a scene. The apparatus includes a light source, a timing system and a detector system. The light source emits pulses of light toward the object or target scene being imaged. In one embodiment, the light source is a laser. The timing system measures the round-trip travel time of each pulse of light emitted by the light source. In one scannerless embodiment, the detector system includes an optical system and a monolithic array of light detectors operating in non-linear Geiger-mode. The optical system collects a portion of the light scattered off of objects in the target scene and directs the collected light toward the array of light detectors. The monolithic array of light detectors detects light reflected back from objects in the target scene. In one scanning embodiment, the detector system includes an optical system and a single light detector operating in non-linear Geiger-mode. In this embodiment, the optical system scans the target scene, collects a portion of the light scattered off of objects in the target scene and directs the collected light toward the light detector. The light detector detects light reflected back from objects in the target scene. In another scanning embodiment, the detector system includes a plurality of light detectors operating in non-linear Geiger-mode.

In yet another embodiment, the laser radar system includes a processor which develops an image of the target scene. In one scannerless embodiment, the processor develops the image in response to the positions of the light detectors in the array of light detectors detecting reflected light and the corresponding round-trip travel times of the pulse of light measured by the timing system. In one scanning embodiment, the processor develops the image in response to the angular position of the optical system and the corresponding round-trip travel times of the pulses of light measured by the timing system.

The present invention has the technical advantages of: being light-weight; having non-cryogenic cooling requirements; having false alarm rates less than 10–5 per meter in range; having a ranging precision better than three centimeters; and having a single photon detection efficiency greater than forty percent. The scannerless embodiment of the present invention has the further advantage of having a pixel—pixel crosstalk of less than 0.1 percent.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
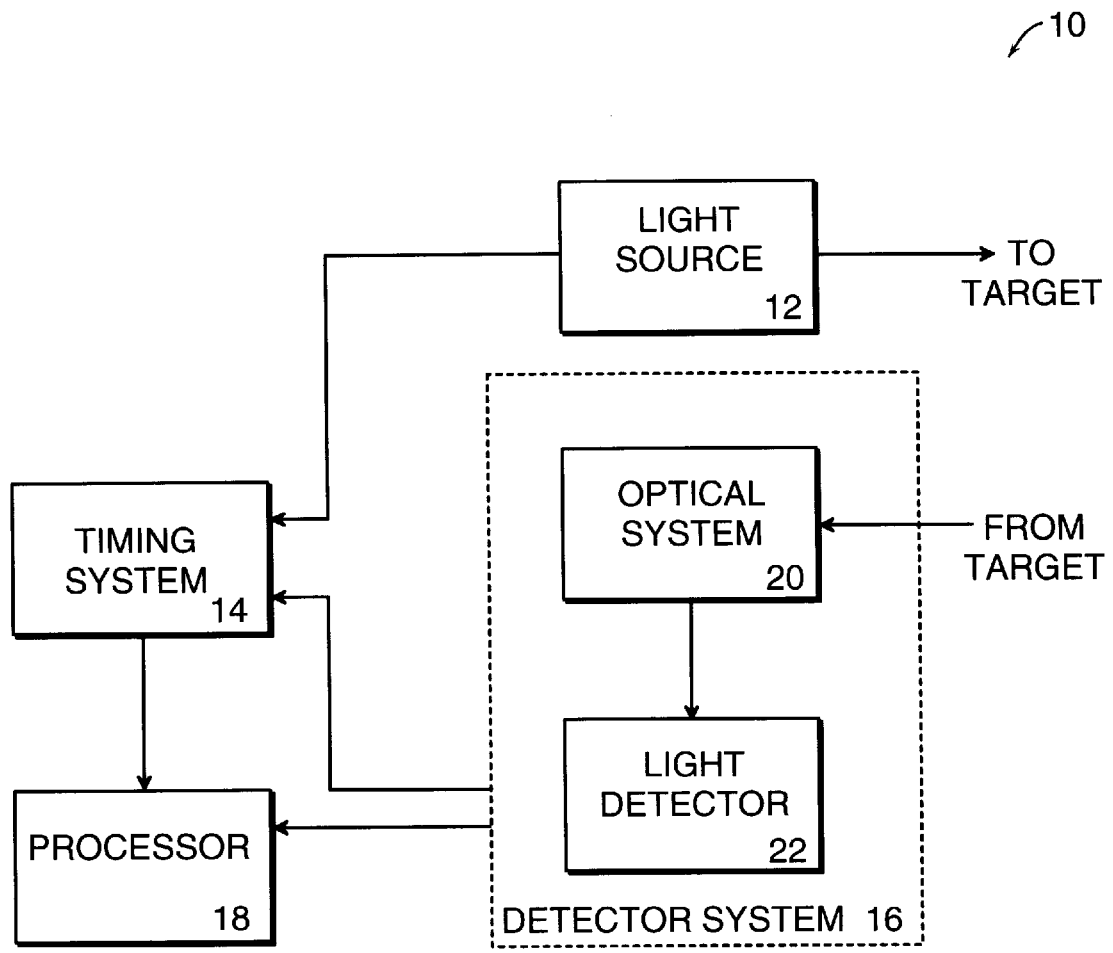
FIG. 1 is a flow diagram of an embodiment of a laser radar system.

In broad overview, and referring to FIG. 1, an embodiment of a laser radar system 10 according to the present invention includes a light source 12, a timing system 14, a detector system 16 and a processor 18. The laser radar system 10 can be used to image a single object or a plurality of objects located in a target scene. As discussed above, the target scene is the region in space to be imaged. The laser radar system 10 uses the light source 12, the timing system 14 and the detector system 16 to measure the shapes of the objects located in the target scene. The laser radar system 10 resolves objects into three dimensions: angle, angle and range. The light source 12 emits pulses of light toward the object or target scene being imaged. The pulses of light illuminate the objects in the target scene. In another embodiment, the light source 12 includes a laser. In one embodiment utilizing a laser as the light source, the laser is a solid state Nd:YAG microchip laser which emits pulses of light having a wavelength ($\lambda$) approximately equal to 532 nanometers (nm). In one embodiment, the laser is a passively Q-Switched Nd:YAG microchip laser with an integrated frequency doubler crystal. In this embodiment, the Nd:YAG laser emits short pulses of light having a wavelength approximately equal to 532 nm and a duration approximately equal to 220 picoseconds (fwhm). In other embodiments, a different laser may be used. The laser may be any other laser known in the art for use in laser radar systems. The choice of the laser depends on the particular application. For example, in non-visible applications, such as ultra-violet and infrared applications, different lasers emitting pulses of light having different wavelengths would be used. In one embodiment, the light source 12 is stationary. In another embodiment, the light source 12 is moveable.

In yet another embodiment, the light source 12 includes a director disposed to intercept the light pulses emitted by the laser and to direct the light pulses toward the target scene. The director may include lenses mirrors. In another embodiment, the director includes a telescope.

The detector system 16 detects light reflected by the objects in the target scene. The detector system 16 includes an optical system 20 and a light detector 22. The optical system 20 collects a portion of the light scattered off of the objects in the target scene and directs the collected light toward the light detector 22. In one embodiment, the optical system 20 includes an optical lens. In another embodiment, the optical system 20 includes a plurality of lenses. In yet another embodiment, the optical system includes a combination of lenses and mirrors. In one embodiment having a combination of lenses and mirrors, the lenses and mirrors are arranged to intercept the light reflected off of the objects in the target scene and to direct the light toward the light detector 22.

The light detector 22 is positioned to intercept light directed by the optical system 20. The purpose of the light detector 22 is to detect light that is scattered off of the objects in the target scene. In one embodiment, the light detector 22 includes a single light detector which operates in non-linear Geiger-mode. In one embodiment which has only a single light detector, the light detector 22 is a Silicon Avalanche Photodiode (Si APD) which operates in non-linear Geiger-mode. To operate a Si APD in non-linear Geiger mode, the bias voltage of the Si APD is set above the breakdown voltage of the Si APD. When the Si APD absorbs an impinging photon, the Si APD releases a photoelectron into the conduction band. Successive collisions within the gain region of the Si APD produces a cascade of electrons.

Typical commercially available linear mode APDs have gains of less than $10^4$. Si APDs operated in non-linear Geiger-mode have much greater gains. In a Si APD operated in non-linear Geiger-mode, the avalanche of electrons quickly saturates and produces a net gain of approximately $10^8$ or greater. In one embodiment, to effectively reset the Si APD, the bias voltage of the Si APD is quickly reduced below the breakdown voltage, thereby quenching the avalanche of electrons. Active quenching circuits can be used to reset the Si APD. Known active quenching circuits quickly reduce the bias voltage of the Si APD to below the breakdown voltage and have demonstrated detector reset times of between five (5) and fifteen (15) nanoseconds. In other embodiments, passive quenching of the avalanche of electrons is achieved as the bias field is temporarily reduced by the space-charge effects of the electron avalanche itself.

In yet another embodiment in which the light detector 22 includes a single light detector, the single light detector is capable of operating in linear mode, sub-Geiger mode and Geiger mode. Depending on the application, the user may choose in which mode to operate the light detector.

In another embodiment, the light detector 22 includes a plurality of light detectors which operate in non-linear Geiger-mode. In yet another embodiment, each of the plurality of light detectors is capable of operating in linear mode, sub-Geiger mode and Geiger mode. The user may select in which mode to operate the plurality of light detectors. In another embodiment, the light detector 22 includes a monolithic array of light detectors which operate in non-linear Geiger-mode. In one embodiment having an array of light detectors, each light detector in the array of light detectors is a single APD which operates in non-linear Geiger-mode. In yet another embodiment, each light detector in the array of light detectors is capable of operating in linear mode, sub-Geiger mode and Geiger mode. The user may select in which mode to operate the array of light detectors.

In the embodiment shown in FIG. 1, the timing system 14 is in electrical communication with the light source 12 and the detector system 16. The purpose of the timing system 14 is to determine a round-trip travel time for each pulse of light emitted by the light source 12. As discussed above, the "round-trip travel time" of a pulse of light is the amount of time between the time the light source 12 emits the pulse of light and the time the light detector 22 detects light reflected back from an object in the target scene. The timing system 14 includes a timer which measures the round-trip travel time. The timer begins timing a pulse of light when the timing system 14 receives a signal from the light source 12 indicating that the light source 12 has emitted a pulse of light and ends timing when the timing system 14 receives a signal from the detector system 16 indicating that the light detector 22 has detected reflected light.

In another embodiment, the timing system 14 includes a sensor and a timer in electrical communication with the sensor. The sensor senses when the light source 12 emits a pulse of light and sends a signal to the timer indicating that the light source 12 has emitted a pulse of light. In one embodiment the sensor is a photodetector which is disposed to intercept a portion of the light emitted by the light source 12. The timer begins measuring time upon receiving a signal from the sensor indicating that the light source 12 has emitted a pulse of light.

The processor 18 is in electrical communication with the timing system 14 and the detector system 16. The processor receives signals from the timing system 14 which represents the round-trip travel times of each pulse of light. In one scanning embodiment, the processor 18 determines the position of the detector system 16 and develops an image of the target scene in response to the positions of the detector system 16 and the corresponding round-trip travel time of the pulses of light. This scanning embodiment will be discussed in greater detail below. In another scannerless embodiment, the processor 18 determines which light detectors in the array of light detectors detects reflected light and develops an image of the target scene in response to the positions of the detectors detecting reflected light and the corresponding travel time of the pulse of light for each detector detecting reflected light. This scannerless embodiment will be discussed in greater detail below.

Figure 2:
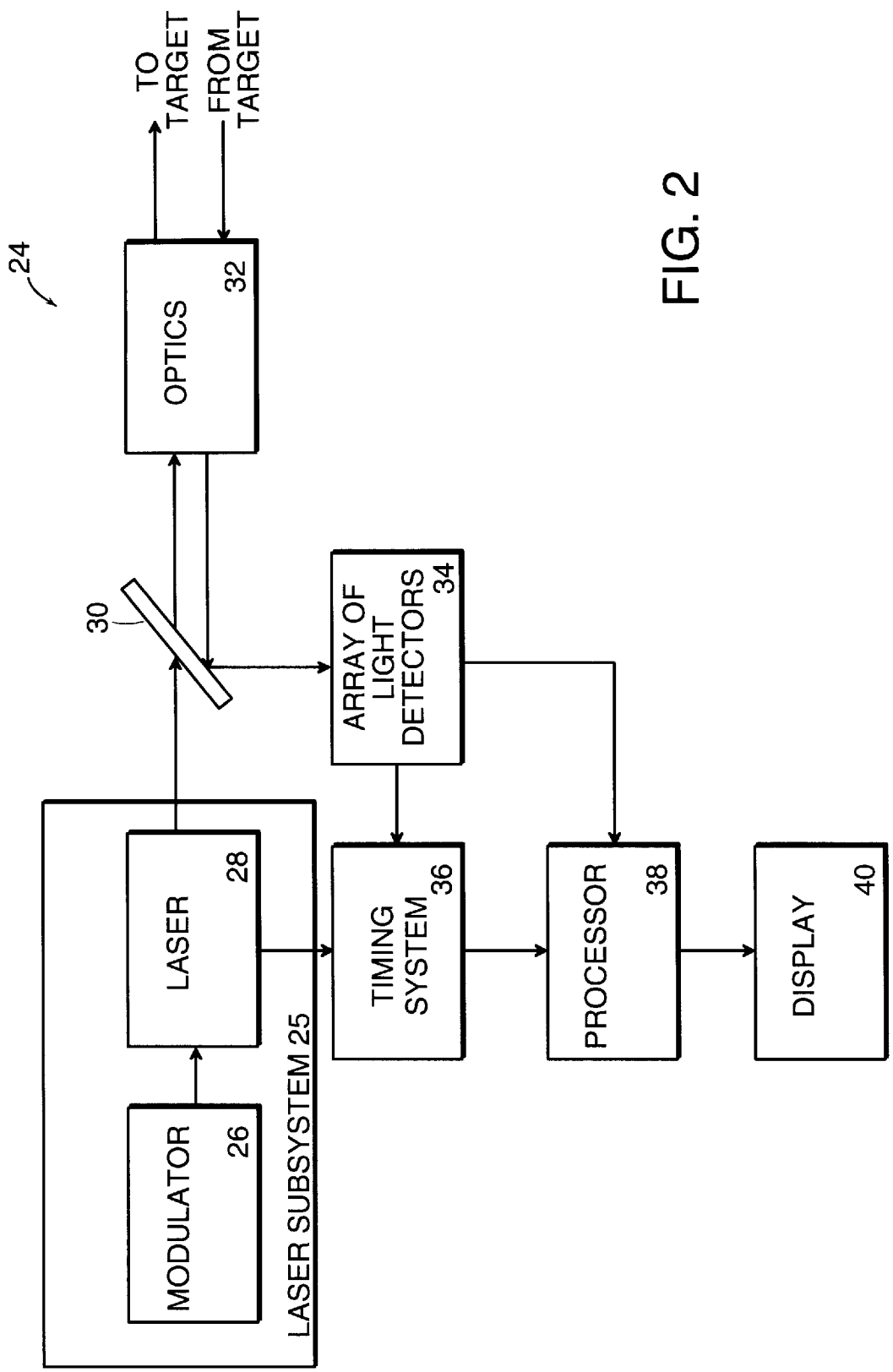
FIG. 2 is a flow diagram of an embodiment of a scannerless laser radar system.

In more detail and referring now to FIG. 2, a more detailed flow diagram shows an embodiment of a scannerless laser radar system 24. The scannerless radar system 24 includes a laser subsystem 25, a transmit/receive switch 30, optics 32, an array of light detectors 34, a timing system 36, a processor 38 and a display 40. In the embodiment shown in FIG. 2, the laser subsystem 25 includes a modulator 26 and a laser 28. In one embodiment, the modulator 26 modulates the amplitude, frequency and phase of the pulse of light emitted by the laser 28. In another embodiment, the laser subsystem 25 does not include a separate modulator 26. In this embodiment, the laser 28 includes the devices necessary to modulate the amplitude, frequency and phase of the pulses of light to be generated. Referring again to the embodiment shown in FIG. 2, the laser 28 is in electrical communication with the modulator 26. As in the laser radar system 10 described above and shown in FIG. 1, the purpose of the laser 28 is to illuminate the objects in the target scene. The laser 28 emits a pulse of light toward the transmit/receive switch 30. In one embodiment, the laser 28 is a solid state Nd:YAG microchip laser with an integrated frequency doubler crystal. In this embodiment, the optical output of the laser 28 is a short pulse of light having a duration approximately equal to 220 picoseconds (fwhm) and a wavelength approximately equal to 532 nanometers.

The transmit/receive switch 30 is positioned to receive the pulse of light emitted by the laser 28. The function of the transmit/receive switch 30 is to switch between a transmitting mode and a receiving mode. The transmit/receive switch 30 directs the pulse of light toward the optics 32. The optics 32 are positioned to receive the pulse of light directed by the transmit/receive switch 30 and to direct the pulse of light toward the target scene. The optics 32 are also positioned to collect a portion of the pulse of light reflected off of objects in the target scene and to direct the collected, reflected light toward the transmit/receive switch 30. The transmit/receive switch 30 is disposed to intercept the collected, reflected light directed by the optics 32 and to direct the collected reflected light toward the array of light detectors 34. In one embodiment, the transmit/receive switch 30 is a duplexer/modulator disc. In other embodiments, the transmit/receive switch 30 can be a spinning mirror, an electro-optic modulator, a Farraday rotator, or any other device known in the art for both transmitting and receiving light.

In yet another embodiment, the laser radar system 24 does not include a transmit/receive switch 30. Instead, this embodiment provides a sub-system for directing the pulse of light toward the target scene and a separate sub-system for collecting a portion of the pulse of light reflected off of objects in the target scene and directing the collected light toward the array of light detectors 34.

In the embodiment shown in FIG. 2, the array of light detectors 34 is disposed to intercept the collected reflected light being directed by the transmit/receive switch 30. The purpose of the array of light detectors 34 is to detect the portion of the pulse of light reflected off of the objects in the target scene. In one embodiment, the array of light detectors 34 is a monolithic array of light detectors operating in non-linear Geiger-mode. In another embodiment, each light detector in the array of light detectors 34 is a single avalanche photodiode.

Figure 3:
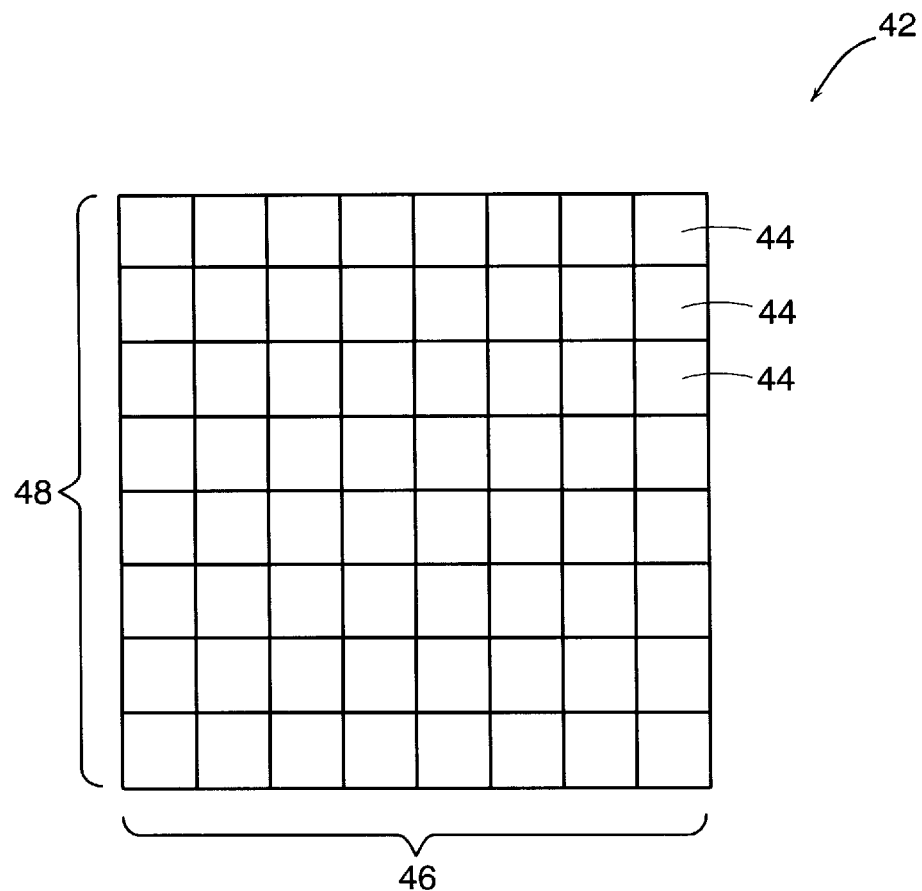
FIG. 3 is a diagram of an embodiment of an array of light detectors.

FIG. 3 shows an embodiment of an array of light detectors 42. The array of light detectors 42 is an 8×8 array of light detectors and includes sixty-four (64) individual light detectors 44 arranged in a square pattern having eight columns 46 and eight rows 48. In other embodiments, the array of light detectors 42 can be a 2×2 array, a 4×4 array, or any other size array. In other embodiments, the individual light detectors 44 in the array of light detectors 42 may be arranged in a rectangular pattern, a circular pattern or any other pattern.

Referring again to FIG. 2, the timing system 36 is in electrical communication with the laser 28 and the array of light detectors 34. As in the laser radar system 10 described above and shown in FIG. 1, the timing system 36 includes a timer which determines the round-trip travel times of the pulses of light emitted by the laser 28. The timing system 36 measures a round-trip travel time of the pulse of light for each light detector in the array of light detectors 34. The timer begins timing a pulse of light when the timing system 36 receives a signal from the laser 28 indicating that the laser 28 has emitted a pulse of light. In another embodiment, rather than receiving a signal from the laser 28, the timing system 36 includes a light detector which detects when the laser 28 emits a pulse of light. The light detector is positioned to intercept a portion of the light emitted by the laser 28. Each light detector in the array of light detectors 34 which detects light sends a signal to the timing system 36 indicating that it has detected light. Upon receiving a signal from a light detector, the timer stops timing the round-trip travel time of the pulse of light for that light detector.

The processor 38 is in electrical communication with the timing system 36 and the array of light detectors 34. The processor 38 receives signals from the timing system 36 which represent the round-trip travel times of the pulse of light for each light detector in the array of light detectors 34 which detects light. The processor 38 determines a corresponding light detector in the array of light detectors 34 for each signal received from the timing system 36. Finally, the processor 38 develops an image of the objects in the target scene in response to the signals received from the timing system and the positions of the corresponding light detectors.

The display 40 is in electrical communication with the processor 38. The display 40 displays the image of the objects created by the processor 38. The display 40 may be a computer screen, television screen, or any other device known in the art for displaying images of objects.

Figure 4:
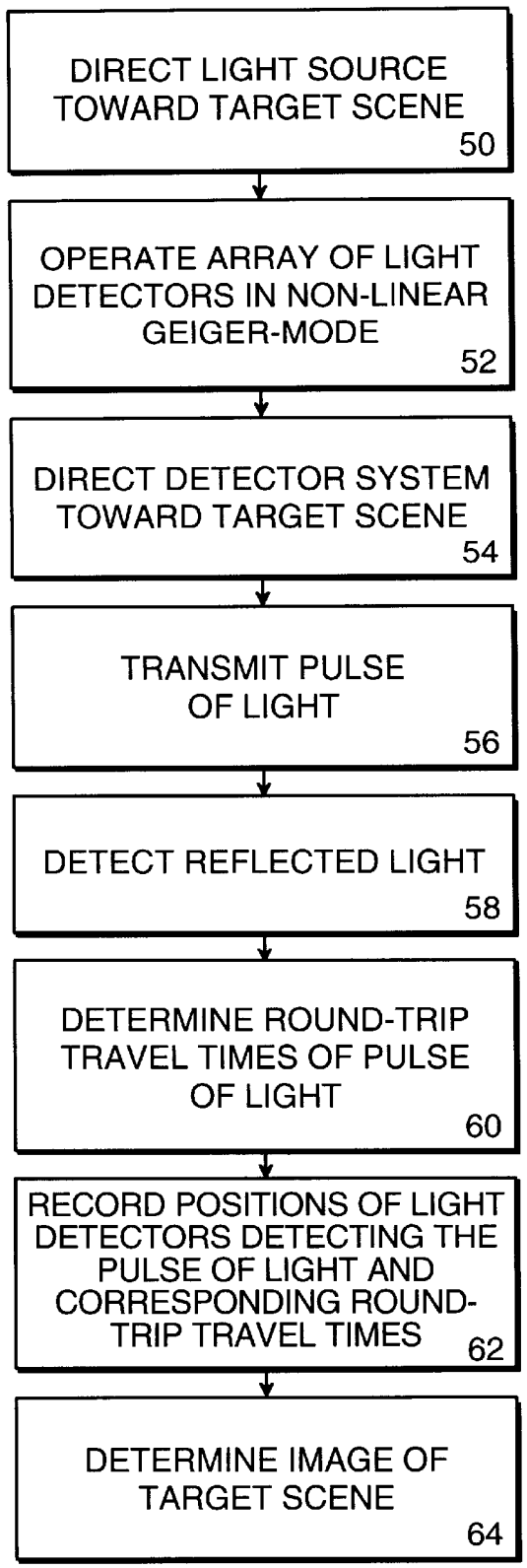
FIG. 4 is a flowchart representation of an embodiment of a process for imaging a target scene using a scannerless laser radar system.

FIG. 4 shows a flowchart which illustrates the steps performed by one embodiment of the method of the present invention for measuring and imaging a target scene using a scannerless laser radar system. In one embodiment, the scannerless laser radar system performing the steps illustrated by the flowchart is the scannerless laser radar system 24 described above and shown in FIG. 2. In step 50, the scannerless laser radar system directs the light source toward the target scene. In step 52, the scannerless laser radar system operates a monolithic array of light detectors in non-linear Geiger-mode. In one embodiment, the light detectors in the monolithic array of light detectors are Si APDs which operate in non-linear Geiger-mode. In step 54, the scannerless laser radar system directs the detector system, which is a sub-system of the scannerless laser radar system, toward the target scene. In step 56, the light source of the scannerless laser radar system transmits a pulse of light toward the target scene. In step 58, the scannerless laser radar system detects light reflected back from objects in the target scene using the monolithic array of light detectors. In step 60, the timing system, which is a sub-system of the scannerless laser radar system, determines a round-trip travel time of the pulse of light emitted by the light source for each light detector in the array of light of light detectors detecting a reflected portion of the pulse of light. In step 62, the laser radar system records the positions of the light detectors in the array of light detectors detecting the pulse of light and the corresponding round-trip travel times of the pulse of light. Finally, in step 64, the laser radar system determines an image of the target scene in response to the recorded positions of the light detectors and the corresponding round-trip travel times of the transmitted pulse of light. In one embodiment, the laser radar system performs the additional step of displaying the image of the target scene on a display.

Figure 5:
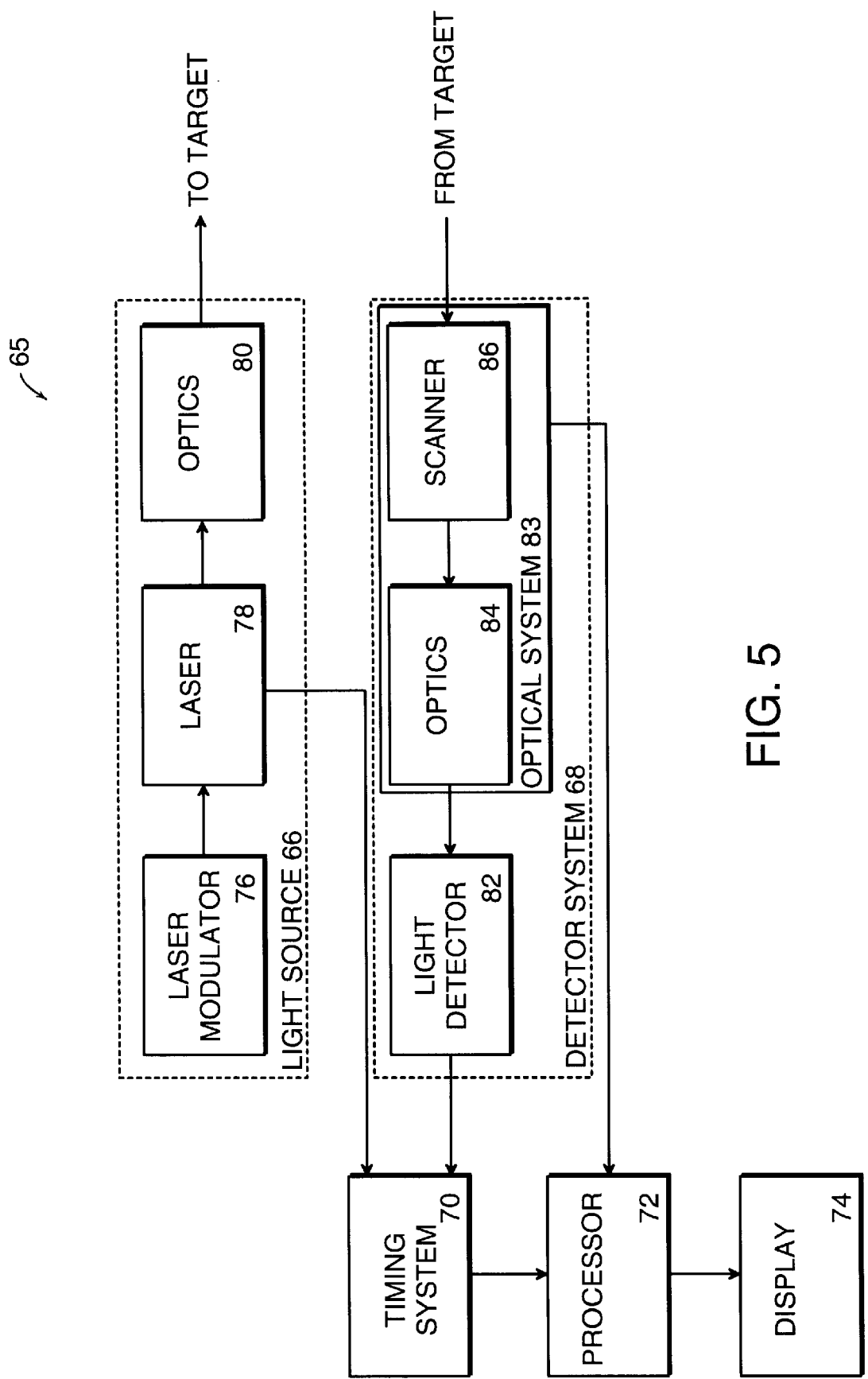
FIG. 5 is a flow diagram of an embodiment of a scanning laser radar system.

Referring now to FIG. 5, a more detailed flow diagram shows an embodiment of a scanning laser radar system 65. Scanning laser radar system 65 includes a light source 66, a detector system 68, a timing system 70, a processor 72, and a display 74. In the embodiment shown in FIG. 5, the light source 66 includes a laser modulator 76, a laser 78 and optics 80. In one embodiment, the modulator 76 modulates the amplitude, frequency and phase of the pulse of light emitted by the laser 78. In another embodiment, the light source 66 does not include a separate modulator 76. In this embodiment, the laser 78 includes the devices necessary to modulate the amplitude, frequency and phase of the pulses of light to be generated. Referring again to the embodiment shown in FIG. 5, the laser 78 is in electrical communication with the modulator 76. As in the laser radar system 10 described above and shown in FIG. 1, the purpose of the laser 78 is to illuminate the objects in the target scene. The laser 78 emits a pulse of light toward the optics 80. In one embodiment, the laser 78 is a solid state Nd:YAG microchip laser with an integrated frequency doubler crystal. In this embodiment, the optical output of the laser 78 is a short pulse of light having a duration approximately equal to 220 picoseconds (fwhm) and a wavelength approximately equal to 532 nanometers. The optics 80 are disposed to intercept the light pulses emitted by the laser 78. The optics 80 operate as a director and direct the pulses of light emitted by the laser 78 toward the target scene. The optics 80 may include lenses and mirrors. The optics 80 may also include a telescope.

The detector system 68 includes a light detector 82 and an optical system 83. As described above, the purpose of the light detector 82 is to detect the portion of the light reflected off of the objects in the target scene. In one embodiment, the light detector 82 is a single solid state light detector which operates in non-linear Geiger-mode. In another embodiment, the light detector 82 includes a plurality of solid state light detectors which operate in non-linear Geiger-mode. The plurality of light detectors may be arranged in a line, a square, a circle or any other arrangement. In one embodiment, the light detector 82 is a Si APD which operates in non-linear Geiger-mode.

The optical system 83 is positioned to direct light onto the light detector 82. The optical system 83 includes optics 84 and a scanner 86. The optical system 83 scans the object or target scene being imaged, collects a portion of the light scattered off of the object or target scene and directs the collected light toward the light detector 82. In one embodiment, the optical system 83 raster scans the object or target scene being imaged. The scanner 86 scans the object or target scene being imaged. In one embodiment, the scanner 86 includes a scanning mirror and motor mechanically coupled to the scanning mirror. The mirror collects light reflected back from the target scene. The motor directs the scanning mirror along a scanning path. In one embodiment the scanning path is a raster scanning path. The motor may also direct the scanning mirror along a spiral path, a Palmer scanning path, or any other path. In another embodiment, the scanner 86 is programmable and the user may select from a variety of pre-programmed scanning paths or may input a new scanning path.

In another embodiment, the scanner 86 includes two scanning mirrors and a motor mechanically coupled to the two scanning mirrors. The motor directs one of the scanning mirrors along a first scanning path and the second scanning mirror along a second scanning path. In one embodiment the motor directs the two scanning mirrors along raster scanning paths that are perpendicular to each other. In other embodiments, the scanner 86 may include rotating wedges or translating microlenses in addition to or in place of mirrors. The scanner 86 may also include any other device known in the art for scanning subsystems.

The optics 84 are disposed to intercept the light directed by the scanner 86 and to direct the light toward the light detector 82. The optics 84 may include mirrors, lenses, and any other device known in the art for directing light.

In one embodiment of the detector system 68 in which the light detector 82 includes a single light detector, the scanner 86 performs a two-dimensional scan in order to image a two or three-dimensional region. In another embodiment of the detector system 68 in which the light detector 82 includes a plurality of light detectors arranged in a linear pattern, the scanner 86 need only perform a one-dimensional scan in order to image a two or three-dimensional region.

The timing system 70 is in electrical communication with the laser 78 and the light detector 82. As in the laser radar system 10 described above and shown in FIG. 1, the timing system 70 includes a timer which determines the round-trip travel times of the pulses of light emitted by the laser 78. The timer begins timing a pulse of light when the timing system 70 receives a signal from the laser 78 indicating that the laser 78 has emitted a pulse of light. In another embodiment, rather than receiving a signal from the laser 78, the timing system 70 includes a light detector which detects when the laser 78 emits a pulse of light. The light detector is positioned to intercept a portion of the light emitted by the laser 78. The light detector 82 sends a signal to the timing system 70 indicating that it has detected light. Upon receiving a signal from a light detector 82, the timer stops timing the round-trip travel time of the pulse of light.

The processor 72 is in electrical communication with the timing system 70 and the detector system 68. The processor 72 receives signals from the timing system 70 which represent the round-trip travel times of each pulse of light transmitted by the laser 78. The processor 72 determines a corresponding angular position of the optical system 83 for each signal received from the timing system 70. The angular position of the optical system 83 indicates the position of the location from which the detector system 68 is detecting light. In one embodiment, the processor 72 determines the angular position of the scanner 86. Finally, the processor 72 develops an image of the objects in the target scene in response to the signals received from the timing system 70 and the corresponding angular positions of the optical system 83.

The display 74 is in electrical communication with the processor 72. The display 74 displays the image of the objects created by the processor 72. The display 74 may be a computer screen, television screen, or any other device known in the art for displaying images of objects.

Figure 6:
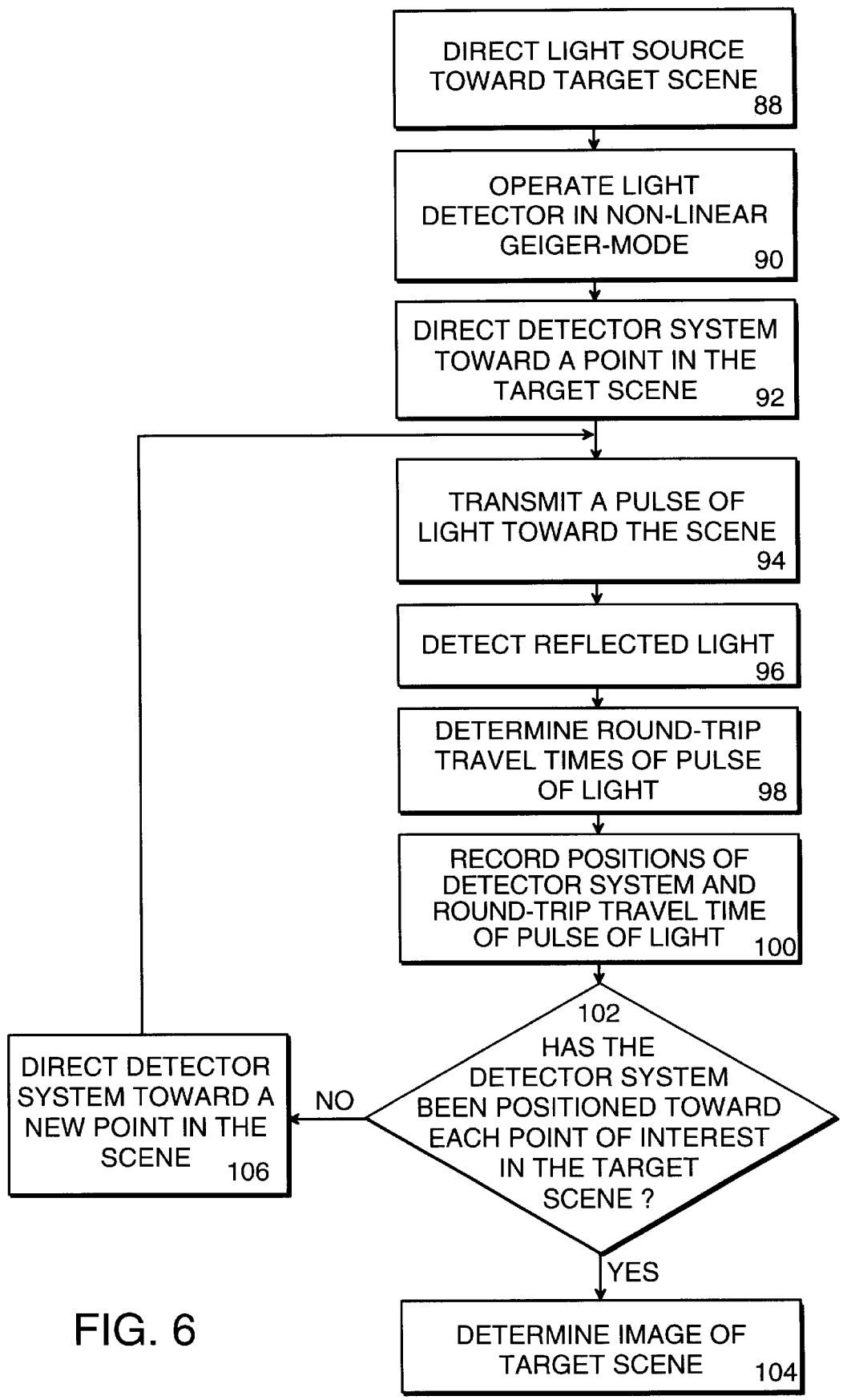
FIG. 6 is a flowchart representation of an embodiment of a process for imaging a target scene using a scanning laser radar system.

FIG. 6 shows a flowchart which illustrates the steps performed by one embodiment of the method of the present invention for imaging a target scene using a scanning laser radar system. In one embodiment, the scanning laser radar system performing the steps illustrated by the flowchart is the scanning laser radar system 65 described above and shown in FIG. 5. In step 88, the scanning laser radar system directs a light source toward the target scene. The target scene comprises a plurality of points of interest. In step 90, the scanning laser radar system operates the light detector of the detector system in non-linear Geiger-mode. In one embodiment, the light detector is a Si APD which operates in non-linear Geiger-mode. In step 92, the scanning laser radar system directs the detector system, which is a subsystem of the scanning laser radar system, toward a point of interest in the target scene. In step 94, the light source of the scannerless laser radar system transmits a pulse of light toward the target scene. In step 96, the scanning laser radar system detects light reflected back from the target scene using the light detector. In step 98, the timing system, which is a sub-system of the scanning laser radar system, determines a round-trip travel time of the pulse of light emitted by the light source. In step 100, the laser radar system records the position of the detector system and the corresponding round-trip travel time of the pulse of light. In step 102, the scanning laser radar system determines if the detector system has been positioned toward each point of interest in the target scene. If the detector system has been positioned toward each point of interest in the target scene, the scanning laser radar system proceeds to step 104. In step 104, the laser radar system determines an image of the target scene in response to the recorded positions of the detector system and corresponding round-trip travel times of the transmitted pulses of light. If the detector system has not been positioned toward each point of interest in the target scene, the scanning laser radar system proceeds to step 106. In step 106 the detector system is directed toward a new point of interest in the target scene. The scanning laser radar system then returns to step 94 and repeats steps 94 through 102 for each of the plurality of points of interest in the target scene. The number of points of interest is determined by the quality of the image desired. In one embodiment, the laser radar system performs the additional step of displaying the image of the target scene on a display.

Design of a 3D Imaging Laser Radar System with Photonic Sensitivity

The laser radar systems 10, 24 and 65 described above and shown in FIGS. 1, 2 and 5 were designed during a research effort to develop a light-weight direct detection laser radar system which can measure three dimensional (3D) spatial structure of objects in a target scene with extreme sensitivity. One goal of the research effort was to investigate the technical feasibility and utility of a direct detection laser radar system capable of resolving objects into three dimensions (angle-angle-range images) with each transmitted laser pulse. A second goal of the research effort was to demonstrate that 3D imaging laser radar systems with photon-counting sensitivity were technically feasible, and could, given equal power-aperture products, out perform competing design concepts such as coherent range-Doppler imaging systems.

Figure 7:
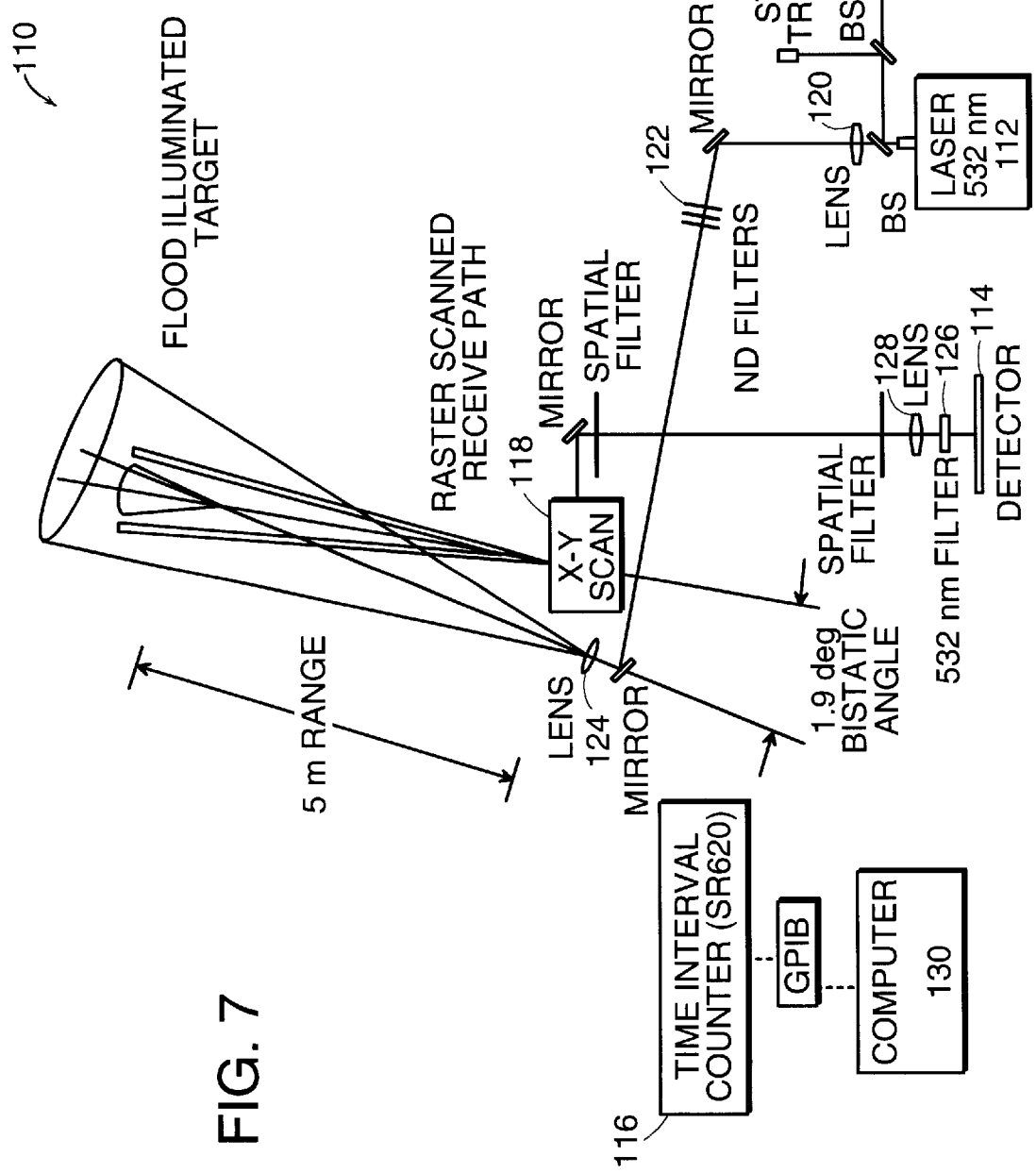
FIG. 7 is a diagram of an embodiment of a 3D imaging photon-counting laser radar system used in a series of experiments.

FIG. 7 shows an embodiment of a laser radar system 110 evaluated during the research effort. There were many goals in designing laser radar system 110. The first goal was to develop a system which has non-cryogenic cooling requirements. Preferably, the laser radar system should operate at room temperature or with modest Thermo-Electric (TE) cooling. The second goal was to develop a detector system which has false alarm rate of less than 10–5per meter in range. The third goal was to develop a laser radar system having ranging precision better than fifteen (15) centimeters. The fourth goal was to develop a detector system having a pixel-to-pixel crosstalk less than one percent. The final goal was to develop a detector system having single photon detection efficiency greater than forty percent.

The laser radar system 110 satisfies these goals and demonstrated extreme sensitivity with, on average, less than one photon per image pixel. The four key components of the laser radar system 110 are the laser 112, the detector 114, the timing system 116 and the scanning optical system 118. The laser 112 is a passively Q-Switched solid state Nd:YAG microchip laser with an integrated frequency doubling crystal. The optical output of the laser 112 is a short pulse of 220 picoseconds duration (fwhm) at a wavelength of 532 nanometers. Several detectors 114 were tested. The detector 114 which demonstrated the best performance is a Si APD which was operated in non-linear Geiger mode. The Si APD used as the detector 114 was developed by Radiation Monitoring Devices, Inc. of Watertown, Mass. This detector has single photon counting sensitivity. The Stanford Research Systems Model 620 Universal Time Interval Counter was used as the timing system 116. The Model 620 Universal Time Interval Counter has a time interval least significant bit precision of twenty-five picoseconds. The scanning optical system 118 used was a commercially available 2-axis scanning mirror subsystem available from General Scanning, Inc.

During the experiments, a single laser pulse was transmitted by the laser 112 for each angular position of the scanning optical system 118. The range was measured for each element of the object surface by measuring the round-trip travel time of the pulse of light from the laser 112 to the target object and back to the detector 114. The laser radar system 110 demonstrated three centimeter range resolution with a twenty-five to sixty percent probability of detecting single photons.

Experimental Procedures:

The passively Q-Switched, frequency-doubled, microchip laser 112 is described in J. J. Zayhowski and C. Dill III, "Diode pumped passively Q-switched picosecond microchip lasers," Opt. Lett. 19, pp. 1427–1429, Sept. 15, 1994 and J. J. Zayhowski, "Passively Q-switched microchip lasers," Laser Focus World (Penwell Publishing Co., Tulsa, Okla.), April, 1996. The laser 112 operated as the light source and illuminated the objects. The laser 112 output light pulses having a single frequency that were in diffraction-limited $TEM_{00}$ mode. The pulse width of the output light pulses was 220 picoseconds (FWHM). The microchip laser 112 was pumped with a 1.2 W fiber coupled, 808 nanometer diode, Spectra Diode Labs SDL-2372. The diode and its thermoelectric cooler were operated by an ILX LDC-3742 controller. The diode modulation was slaved to the external 1 kHz clock of the Stanford Research Systems Model 620 Time Interval Counter which was used as the timing system 116.

To initiate the round-trip travel time measurement, a fraction of the light pulse emitted by the laser 112 was split off immediately as it exited the housing of the laser 112. The laser beam was allowed to diffract and was then collimated by a 40 cm focal length lens 120. The transmitted pulse energy was 0.8 $\mu$J which was attenuated with a set of New Focus Model 5215 neutral density (ND) filters 122, as needed. A 6.5 centimeter lens 124 was then used to produce a diverging beam which flood-illuminated the target scene, which was between five and twelve meters away. The angular extent of the flood-illuminating transmit beam was typically about 20 mrad.

A variety of objects were used during the series of 3D imaging experiments. In some experiments, simple geometric shapes, such as cones and spheres, were used. Other objects were placed within the scanned target scene to investigate the effects of a wide range in reflected intensity. For example, a clear bicycle reflector and piece of black felt were successfully imaged with a 40 dB dynamic range of return intensity. The dynamic range of this demonstration was limited by the availability of targets.

During the series of experiments, the detector system did not share the same aperture as the laser optical system. However, the apertures were placed 1.5 cm apart which gave a bi-static angle of approximately 2 mrad. To control stray light, 1 cm apertures and a laser line spectral filter 126, Ealing 35-8465, were placed ahead of the detector focusing lens 128. The spectral filter 126 had a spectral width of 1 nm (fwhm), and a 50% maximum transmission at the laser wavelength (532 nm). The detector's instantaneous field of view scanned across the target scene with two orthogonal mirrors mounted on galvanometers, General Scanning Model Z1913. The galvanometer drive signals were derived from two saw-tooth signal generators and amplified by a pair of General Scanning CX660 Scan Control Amplifiers. A 32×32 array of measurements consisting of angle, angle, and round-trip travel time were taken for each frame. The angular width of the frame was typically 62 mrad from edge to edge.

A total of three avalanche photodiodes (APDs) were tested as detectors 114 using this setup. The Model MIT-1 Dual-mode APD detector module was developed by EG&G/Canada to the inventor's specifications. It is capable of operating in either a linear or Geiger-mode. The circular active area of the APD has a 150 $\mu$m diameter.

A 4×4 array of monolithic detectors developed by Radiation Monitoring Devices, Inc. of Watertown, Mass. (RMD) way also tested as a possible detector 114. The array was designed as a test structure for optical communications with four different 2×2 quad arrays per unit. The circular active areas of each of the quad detector elements are normally 10, 20, or 30 $\mu$m in diameter. For each 4×4 array, the pixel-to-pixel pitch is 100 $\mu$m×100 $\mu$m. All the laboratory tests reported here are for one (or two) of the 20 $\mu$m diameter elements.

Simple lenses were used to image light reflected back from the target scene onto the active area of the detector 114. The focal lengths of the lenses were 100 mm and 50 mm, respectively. This gave an instantaneous field of view of 1.5 mrad for the EG&G device and 0.4 mrad for the RMD device.

Both the MIT-1 and RMD detectors 114 required cooling with thermoelectric devices to approximately −20° C. to reduce the dark counts to an acceptable level. The RMD detectors were passively quenched and biased with a voltage of approximately 31 V (about 1.1 times the breakdown voltage). The EG&G APD has an active quenching circuit and its own internal biasing supply of 379V. Additionally, it produced a TTL compatible output pulse for each count received in the Geiger-mode.

The raw output signal from the RMD detector 114 was buffered with a 100 MHz amplifier and differentiated. The resulting pulse was then amplified by 40 dB. This final pulse was sent to the timing system 116 to stop the round-trip travel time measurement.

The timing system 116 used to measure the time between the start and stop pulses was done with the SR620 time interval counter. This instrument has a minimum resolution of 25 psec and a maximum measurement rate of 1 kHz. A computer 130 was used to gather the data and control the timing system 116, the computer 130 used in the series of experiments was a 486 based personal computer. The scanning optical system 118 for the detector 114 was operated open loop. However, synchronization pulses were supplied to the computer 130 to match the beginning of the frame with the start of the data stream from the timing system 116. With the laser 112 pulsing at 1 kHz, the frame rate was 1 Hz. Development, analysis and display of the 3-D images was done off-line on a computer.

Geiger-mode APD Characteristics:

In Geiger-mode operation, the bias voltage of the APD is set above the breakdown voltage of the APD. If any impinging photon is absorbed and a photoelectron is released into the conduction band, a cascade of electrons results from successive collisions within the gain region of the APD. While commercially available linear mode APDs have typically gains of less than $10^4$ for the Geiger-mode detector, the avalanche of electrons quickly saturates with a net multiplication gain of $10^8$ or more. If the bias voltage is quickly reduced below the breakdown voltage, the avalanche of electrons will be quenched and the APD is effectively reset. Passive quenching is achieved as the bias field is temporarily reduced by the space-charge effects of the electron avalanche itself. Active quenching circuits have also been developed which quickly reduce the bias voltage (to below the breakdown voltage) and have demonstrated detector reset times of between five and fifteen nanoseconds.

Figure 8:
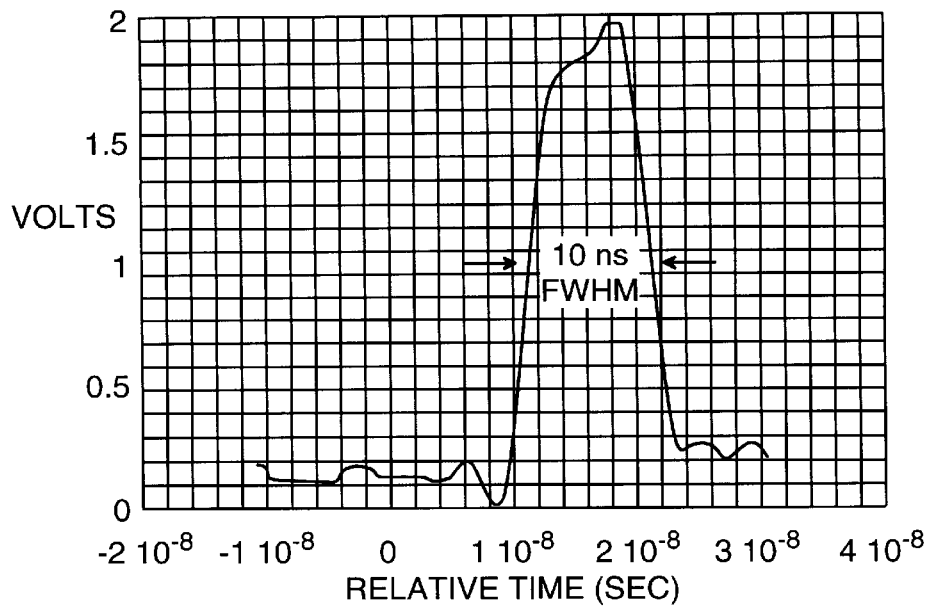
FIG. 8 is a chart illustrating a typical TTL output pulse of a detector operating in Geiger-mode during detection of a single photon.
Figure 9:
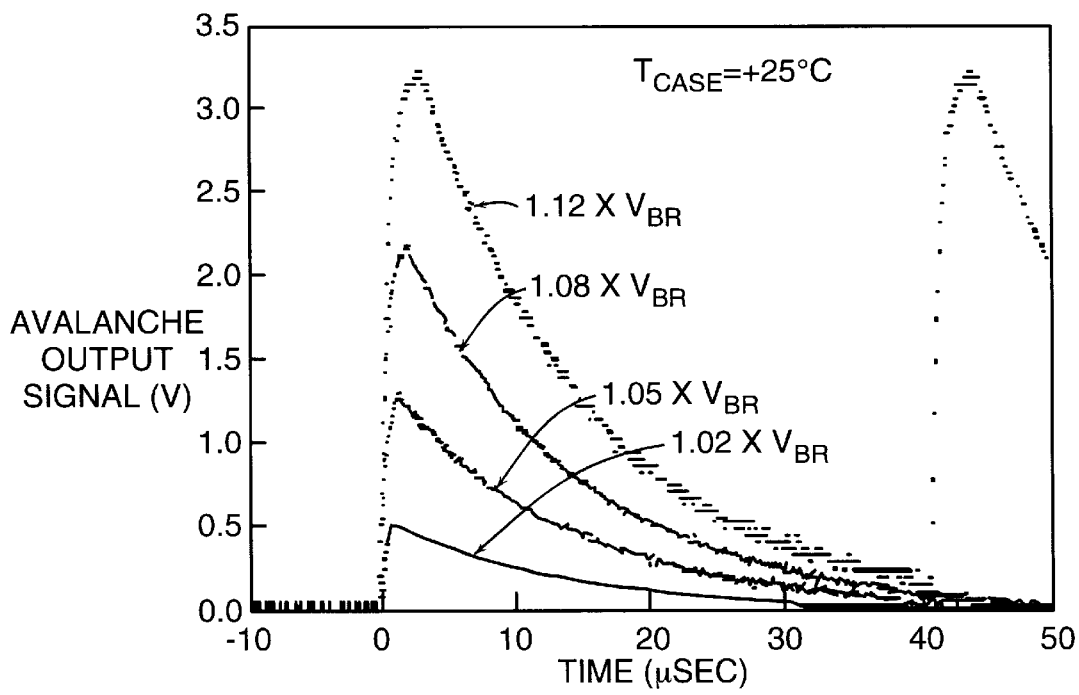
FIG. 9 is a chart illustrating typical raw Geiger-mode APD output pulses for four values of bias voltage.

The MIT-1 detector developed by EG&G used active quenching and reset the detector in about fifteen nanoseconds. FIG. 8 shows a typical TTL output pulse using the MIT-1 detector in the Geiger-mode to detect a single photon. The RMD detectors were used in the series of experiments, use the passive quenching technique and reset in between thirty and fifty microseconds. FIG. 9 shows typically raw RMD output pulses for four values of bias voltage: 2, 5, 8, and 12 percent above the breakdown voltage.

Due to non-linear saturation of the Geiger-mode APD, the intensity of the optical input signal is not readily measured. The detector has a binary response to the optical input. The Geiger-mode detector saturates for one photo-electron or $10^6$ coincidental photo-electrons. This may at first appear to be a distinct disadvantage, i.e. intensity information is being lost. On the other hand, a significant advantage is realized in reduced signal processing throughput. Instead of deducing range to target from the signal intensity versus range, the binary response of the Geiger-mode detector can be used to stop a clock and report range-only information for each pixel. This requires that false alarms/detections from receiver nose and background be negligible. For practical ranging and 3D imaging applications, the range-to-target surface element can be measured with high precision even for a single photon received. If the optical input signal has many photons, the ranging precision is only improved.

Linear detectors such as linear-mode APDs may attempt to deduce information from the measurement of return intensity, but in so doing, must contend with a variety of amplitude noise sources. These include intensity fluctuations in: (1) the illumination due to atmospheric turbulence (referred to as scintillation noise), (2) the back-scattered optical signal due to atmospheric turbulence, (3) the back-scattered optical signal due to speckle effects, and (4) the gain of avalanche photodiodes (Excess Noise Factor, $F_e$).

The excess noise factor can be calculated according to equation (1) below, in which $M_e$ is the electron multiplication and $k_{eff}$ is the ratio of ionization coefficients of holes and electrons.

$$F_e \approx k_{eff} M_e + \left(2 - \frac{1}{M_e}\right)(1 - k_{eff}) \quad (1)$$

For the EG&G Geiger-mode APD, $k_{eff} \approx 0.002$. Using $M_e \approx 10^8$ in equation (1) yields $F_e \approx 10^5$. For a typical linear mode $S_i$ APD, $k_{eff} = 0.02$; Using $M_e \approx 10^3$ in equation (1) yields $F_e \approx 10^2$.

Figure 10:
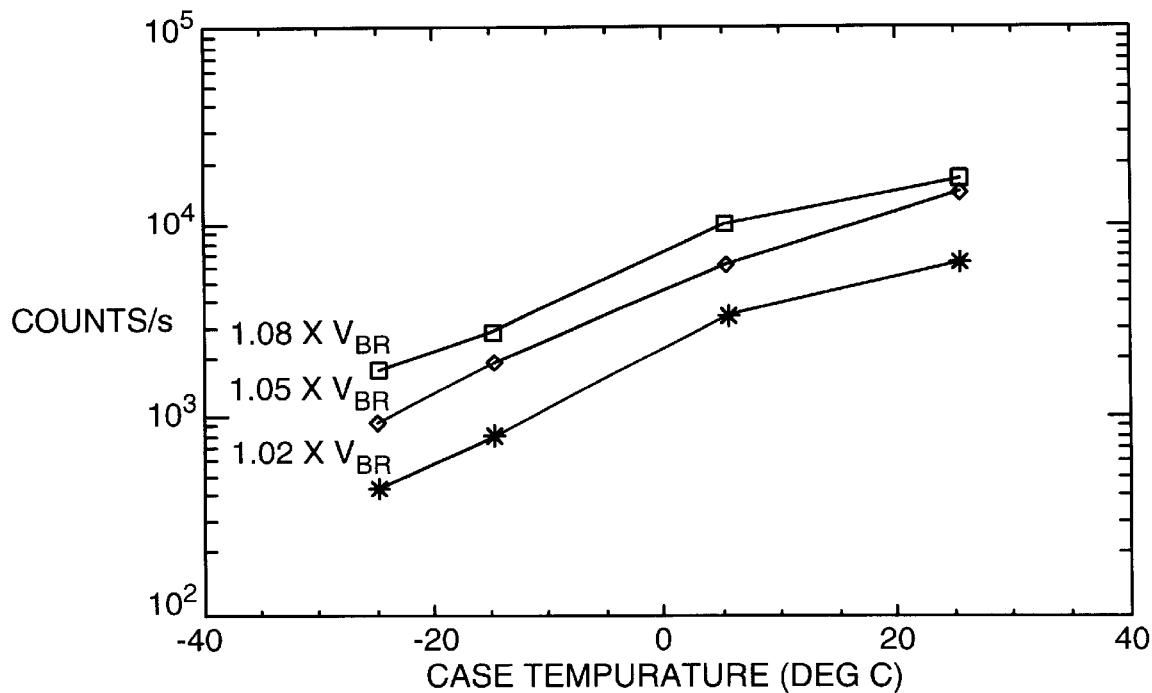
FIG. 10 is a chart illustrating the dark count rate versus case temperature for three values of bias voltage of an APD.

Dark Count Rates:

There were two different packages from RMD which were tested. The first, labeled Package #1, had poor thermal contact between the detector chip and the metal casing. FIG. 10 shows a plot of dark count rate for one of the 20 μm diameter detectors form Package #1 versus case temperature and for several values of $V_b/V_{br}$, where $V_b$=bias voltage and $V_{br}$=breakdown voltage. The breakdown voltage, $V_{br} \approx 29$–32 VDC varies with temperature and was measured at each value of case temperature.

The typical operating conditions for the best results are a case temperature of −23.4 degrees Celsius and a bias in the range of 1.05 to 1.10 times $V_{br}$, (29.50–30.90 VDC). Under these conditions, the dark count rates measured during the series of experiments were less than 2000 cps.

A second device, labeled Package #2, was delivered with much better thermal contact between the detector chip and the brass casing. In addition, two adjacent 20 μm pixels which were separated by a 100 μm pitch were evaluated. Table 1 below shows the reduced dark count rates for elements 1 and 2 of Package #2 (good thermal contact) relative to that of Package #1 (poor thermal contact). There is roughly an order of magnitude reduction in dark count rates with the improved thermal-contact packaging.

TABLE 1

DARK COUNT RATES vs BIAS VOLTAGE
(For case temperature, $T_{case}$ = 23° C.).

| | RMD DEVICE #2 | | |
|---|---|---|---|
| $V_{bias}$ (× $V_{br}$) | ELEMENT #1 | ELEMENT #2 | RMD DEVICE #1 |
| 1.02 | 46 cps | 14 | 457 |
| 1.05 | 156 | 41 | 955 |

TABLE 1-continued

DARK COUNT RATES vs BIAS VOLTAGE
(For case temperature, $T_{case}$ = 23° C.).

RMD DEVICE #2

| $V_{bias}$ (× $V_{br}$) | ELEMENT #1 | ELEMENT #2 | RMD DEVICE #1 |
|---|---|---|---|
| 1.08 | 404 | 111 | 1753 |
| 1.12 | 990 | 747 | — |

Pixel to Pixel Crosstalk Measurements:

Successful APD arrays require low electrical and optical crosstalk between pixels. The pixel-to-pixel crosstalk between the two 20 μm detectors in RMD Device #2 were measured with two different methods.

The first method involved measuring the occurrence of a dark count in one detector and then observing if the adjacent pixel was also triggered. This might be the case if the Geiger-mode avalanche (gain>$10^8$) were to generate a secondary photon which might then be detected in a nearby detector element. The tests resulted in no statistically observed passive crosstalk.

The second method involved use of the laser. The inventor illuminated a small target which was then imaged onto a single detector element. The coincidence of detections was again observed. Five coincident counts in the adjacent detector element were measured with 12,000 detections in the primary element. This results in a crosstalk ratio of less than $5 \times 10^{-4}$.

Photon-counting Sensitivity:

In order to estimate the single photon detection efficiency, we use a reference detector of known detection efficiency was used. Table 2 below shows our measurement of the single photon detection efficiency of the 20 mm RMD detector versus $V_b/V_{br}$, and compares that to the 50% detection efficiency (at 532 nm) of a passively quenched Single Photon Counting Module from EG&G/Canada (model SPCM-100). The RMD detector surpasses that of the SPCM and approached a 60% detection efficiency with $V_b$=1.16×$V_{br}$.

TABLE 2

DETECTION EFFICIENCY vs BIAS VOLTAGE
(For case temperature, $T_{case}$ = -23° C.).

| $V_{bias}$ $V_{break}$ | RMD DETECTION EFFICIENCY |
|---|---|
| 1.02 | 0.24 |
| 1.05 | 0.36 |
| 1.08 | 0.45 |
| 1.12 | 0.53 |
| 1.16 | 0.58 |

Figure 11:
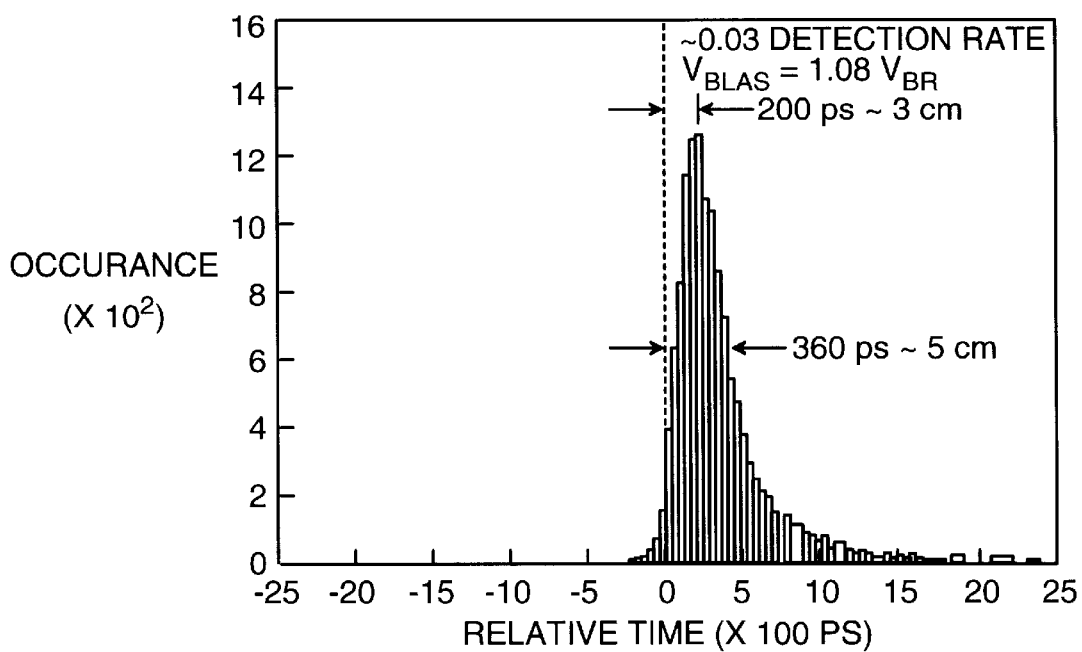
FIG. 11 is a histogram of ranging measurements made with one embodiment of a laser radar system according to the invention.

Single Photon Ranging Precision:

FIG. 11 shows a histogram of the ranging measurements made while the transmit power was attenuated enough to result in a detection rate of approximately 3% (single photon detection). The shape of the histogram is characteristic of the transit pulse shape and exhibits a fwhm of approximately 360 ps which corresponds to about a 5 cm in range depth.

Figure 12:
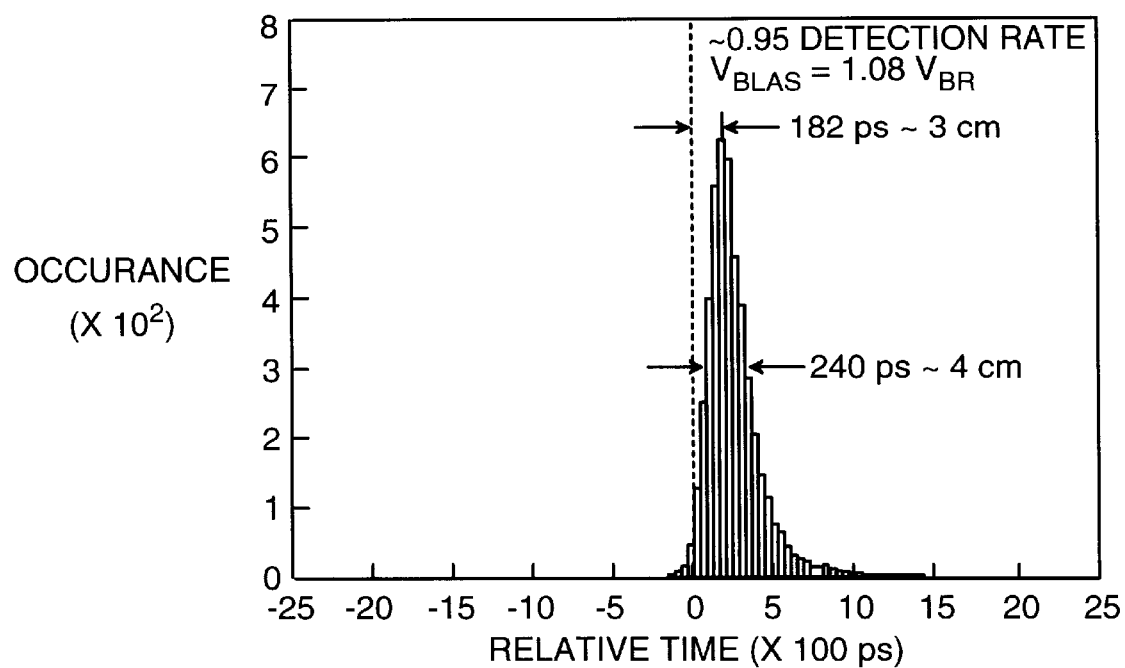
FIG. 12 is a histogram of ranging measurements made with another embodiment of a laser radar system according to the invention.
Figure 13A:
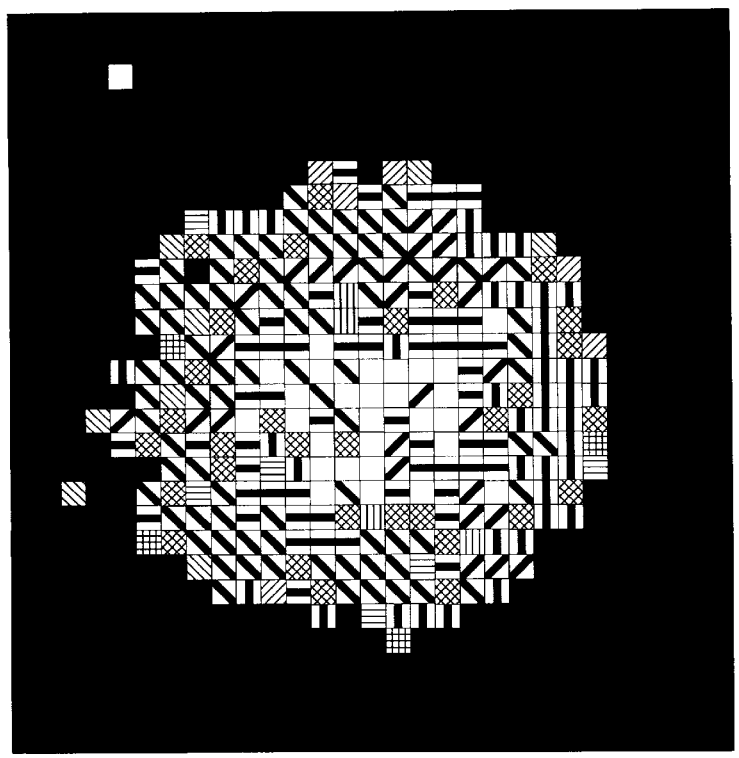
FIG. 13 is a pictorial view of 3D images of a sphere developed with an embodiment of a laser radar system according to the invention.
Figure 13A:
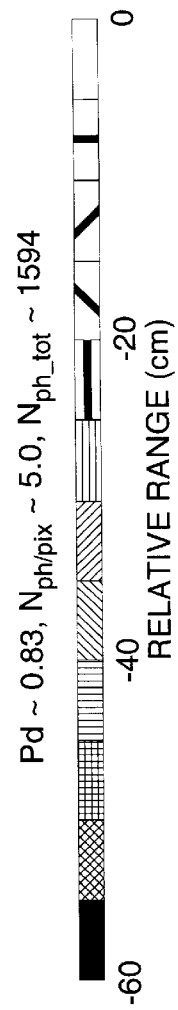
Figure 13C:
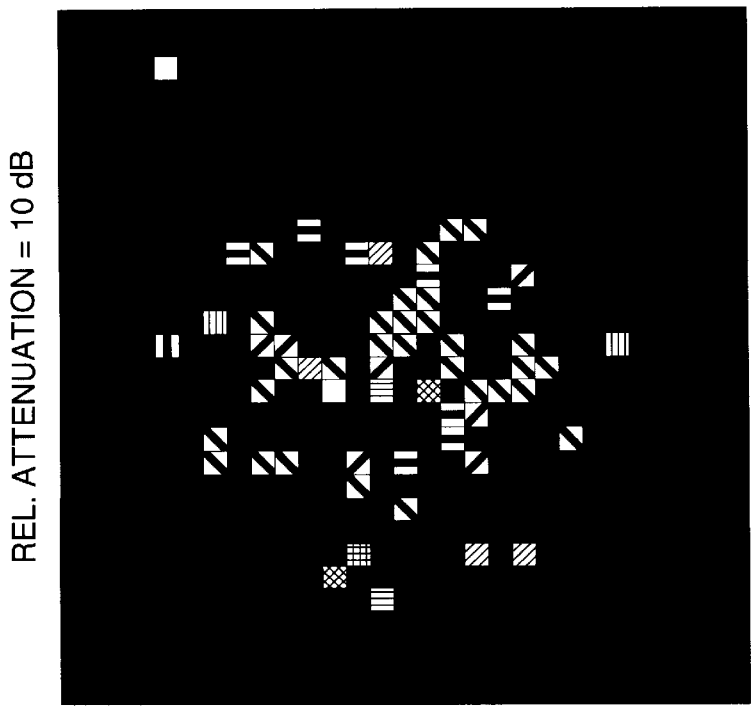
Figure 13C:
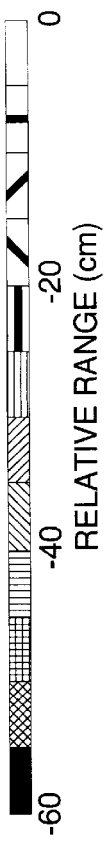
Figure 13B:
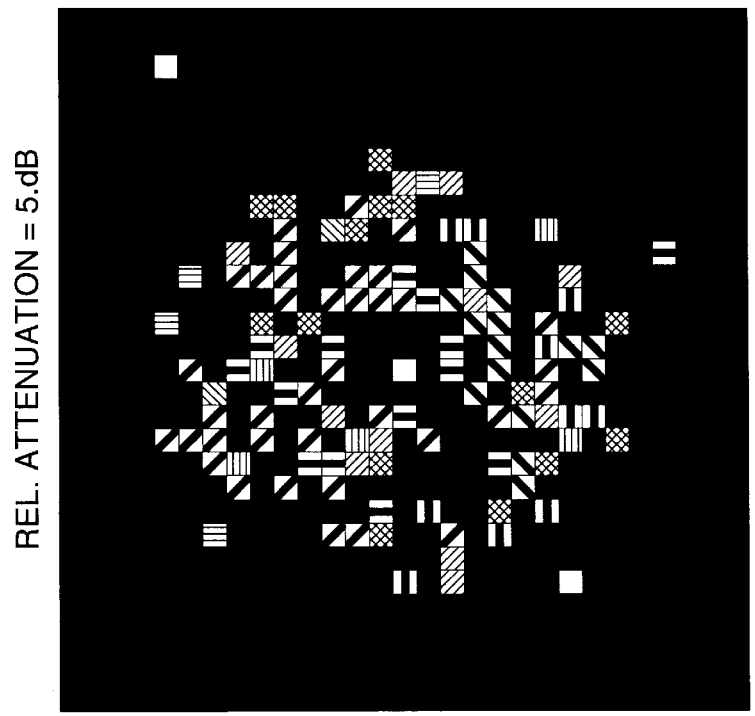
Figure 13B:
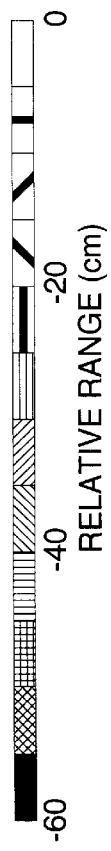
Figure 14B:
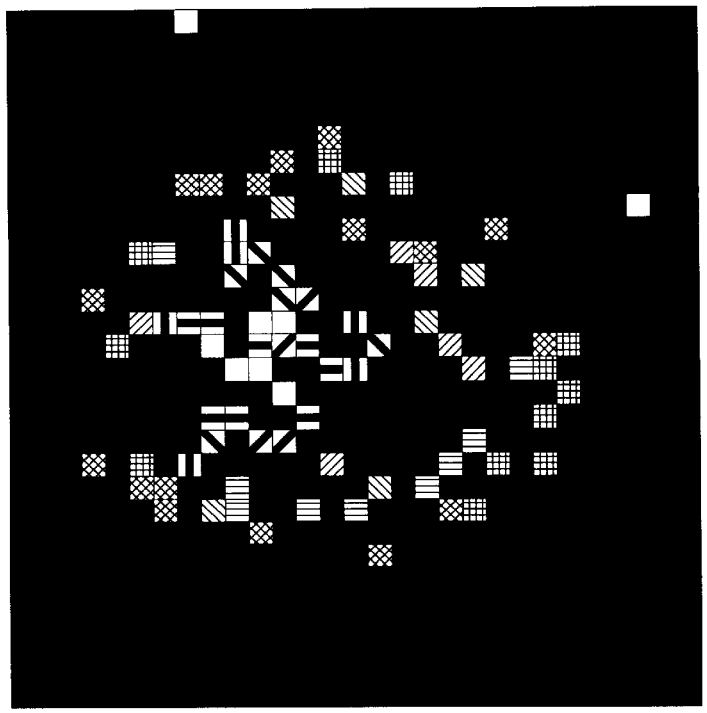
FIG. 14 is a pictorial view of 3D images of a paper cone developed with an embodiment of a laser radar system according to the invention.
Figure 14A:
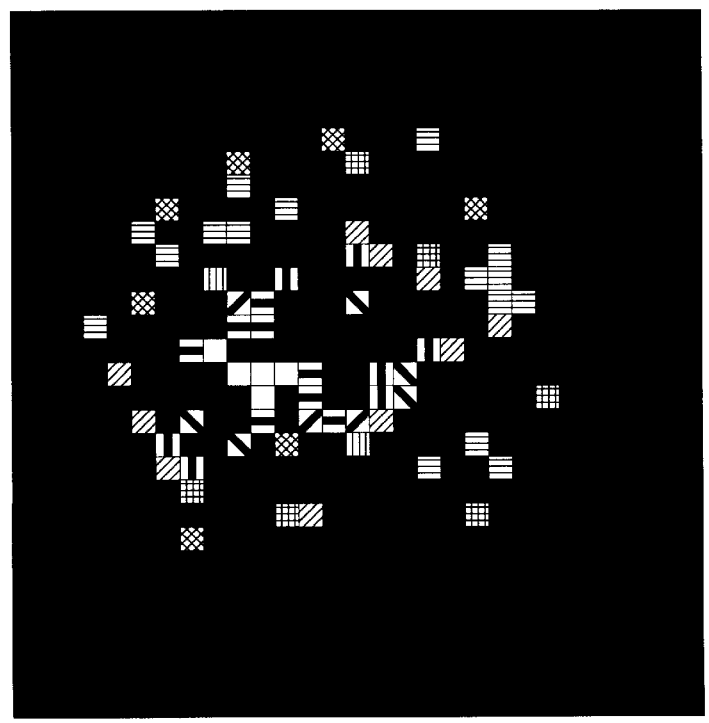
Figure 14D:
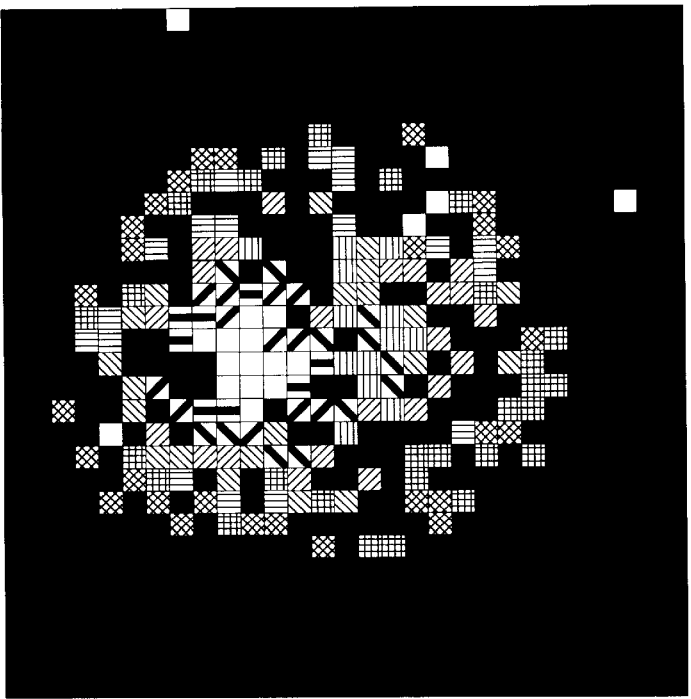
Figure 14D:
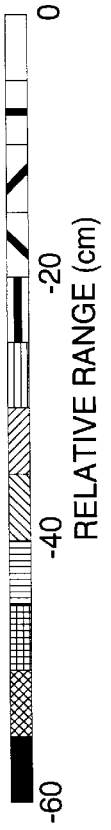
Figure 14C:
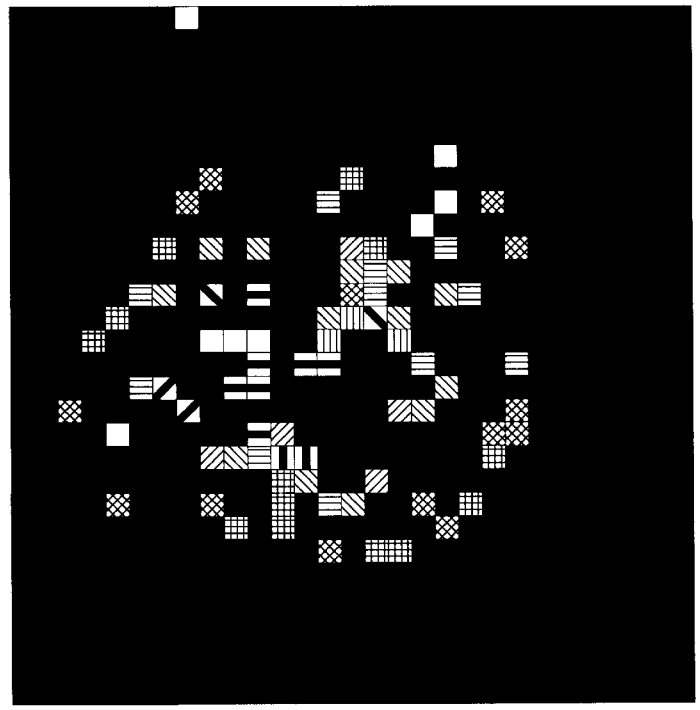
Figure 14C:
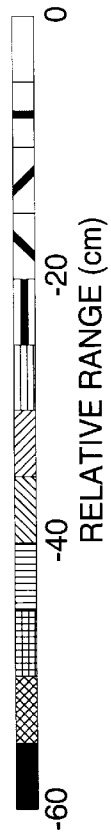
Figure 14F:
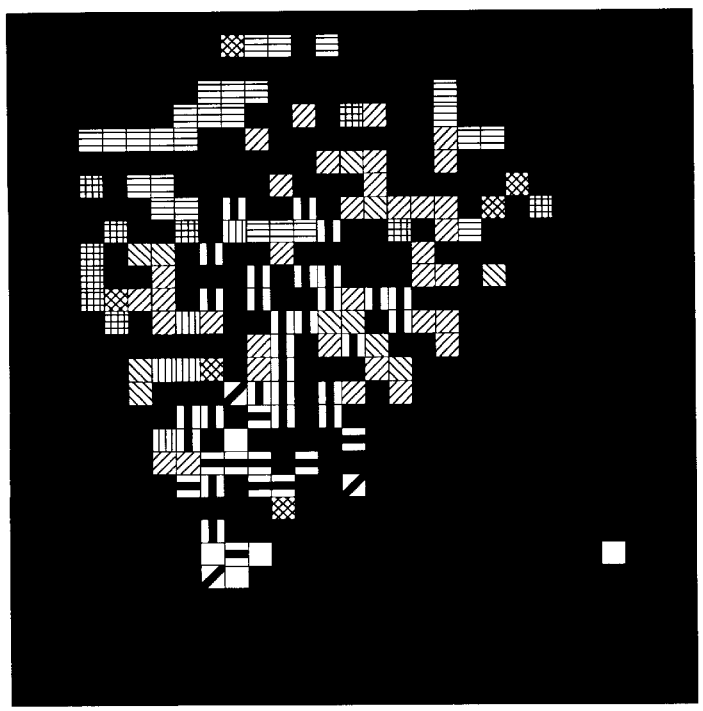
Figure 14E:
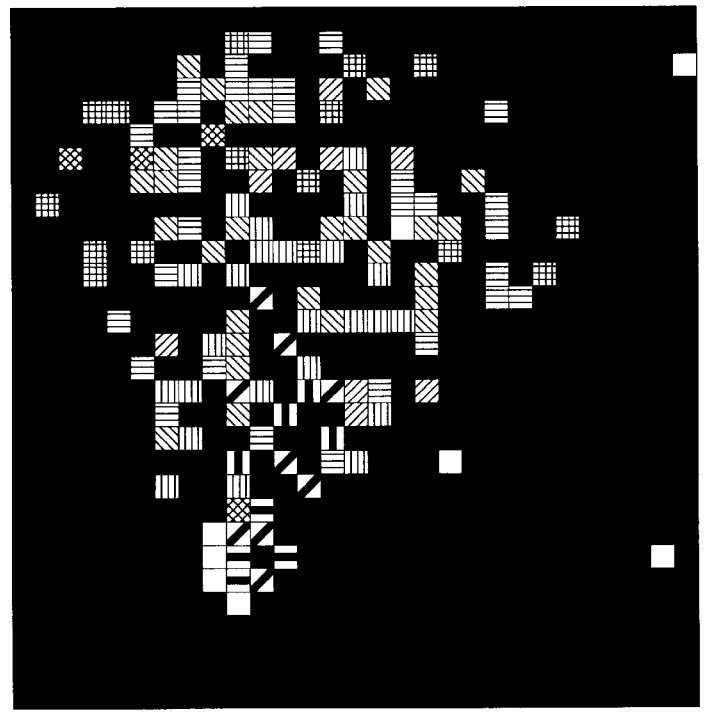
Figure 14H:
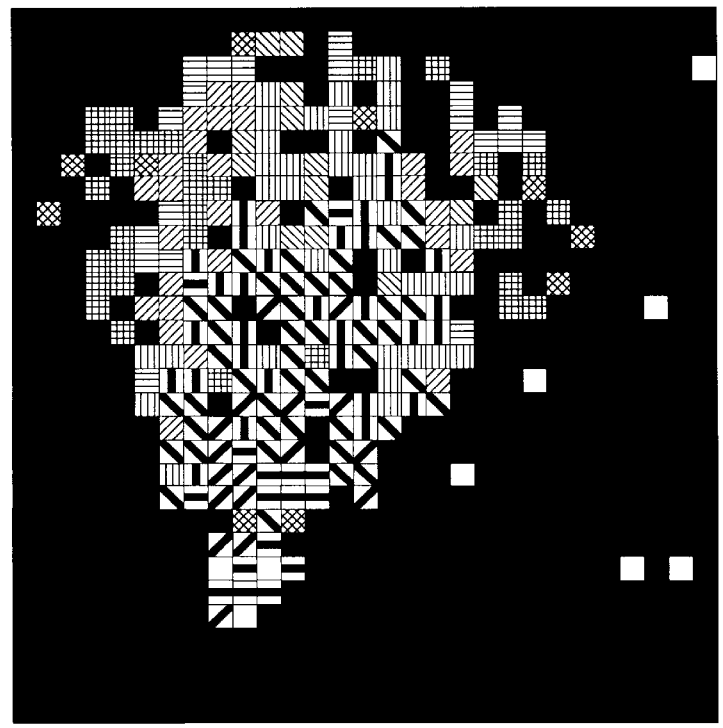
Figure 14H:
Figure 14G:
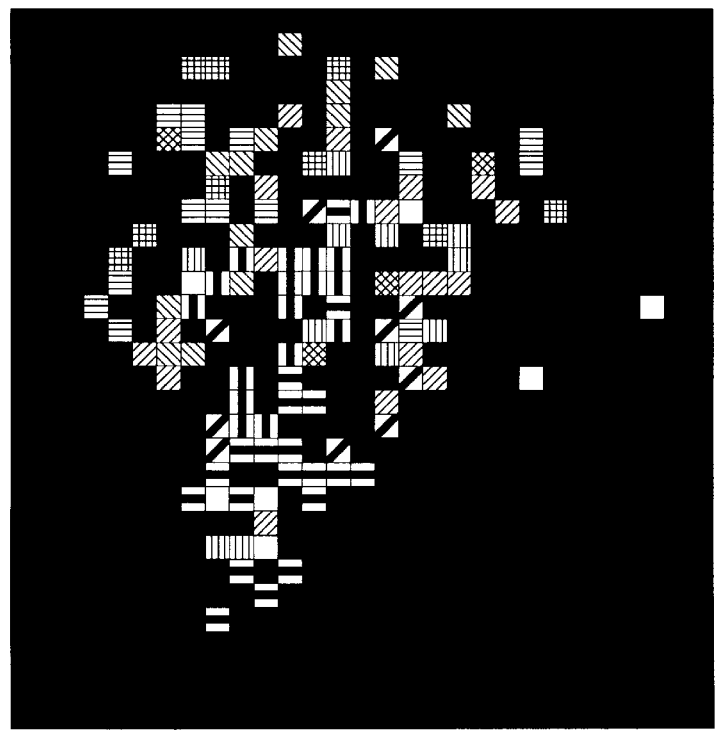
Figure 14G:
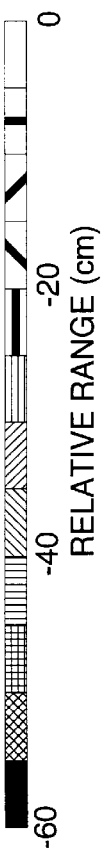
Figure 14J:
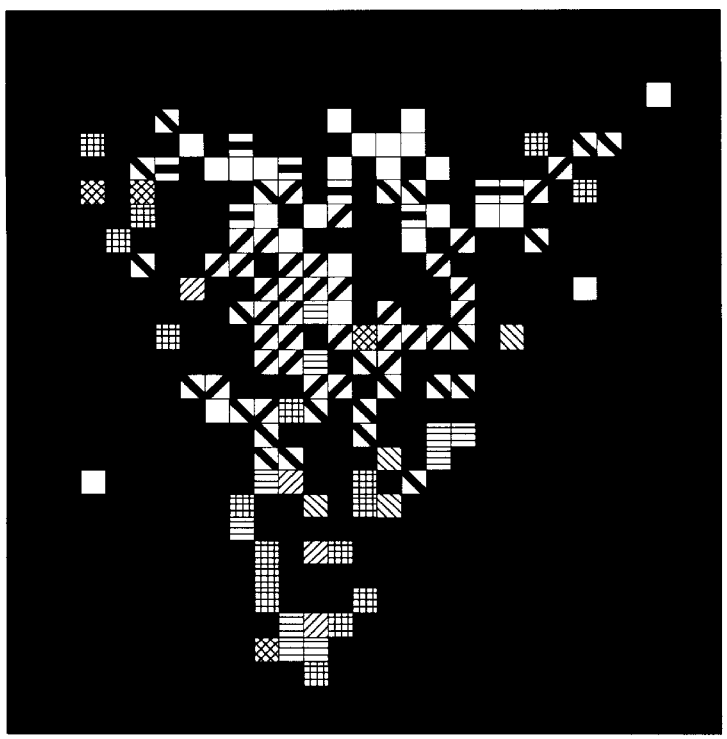
Figure 14J:
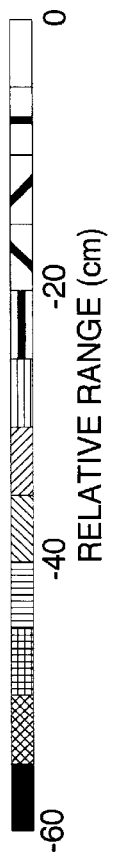
Figure 14I:
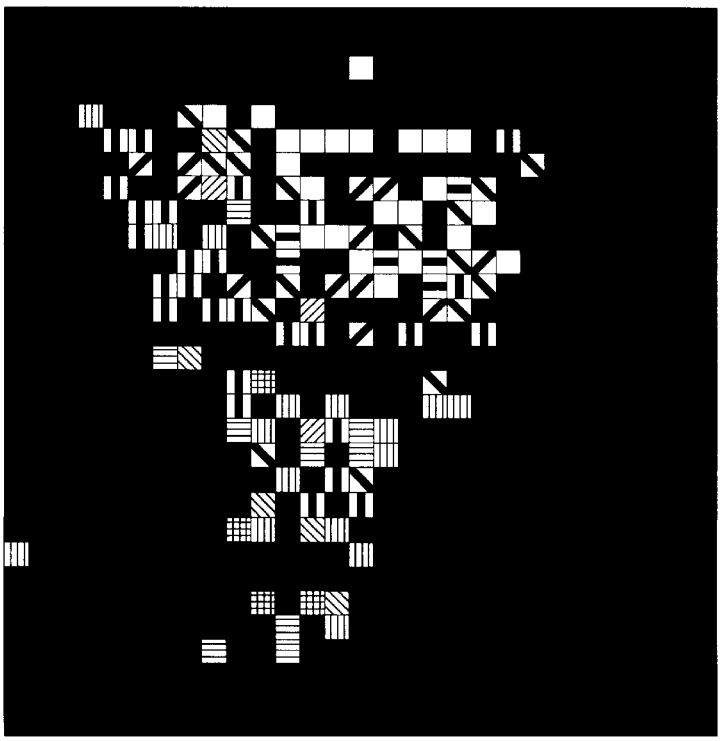
Figure 14I:
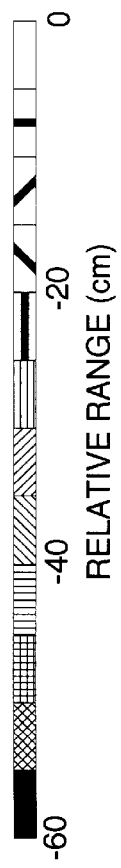
Figure 15B:
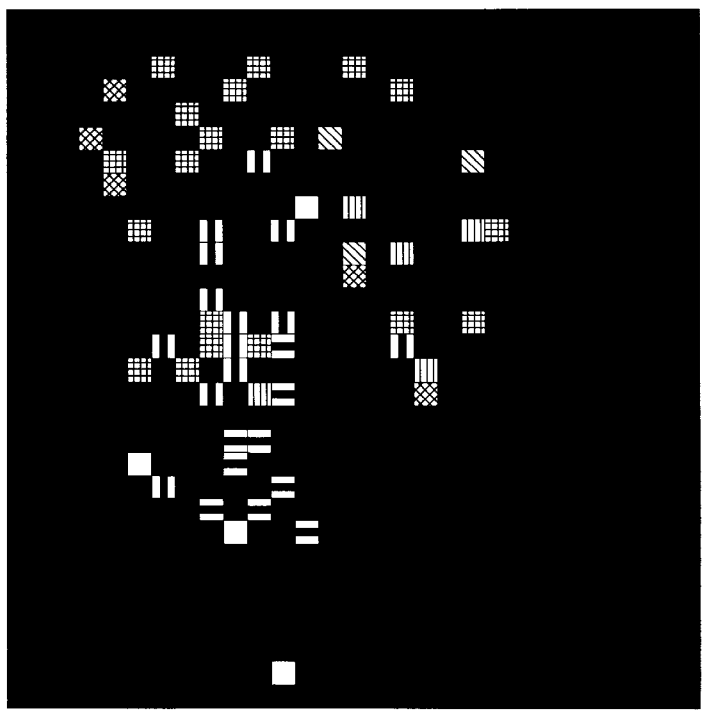
FIG. 15 is a pictorial view of 3D images of a paper cone developed with an embodiment of a laser radar system according to the invention.
Figure 15B:
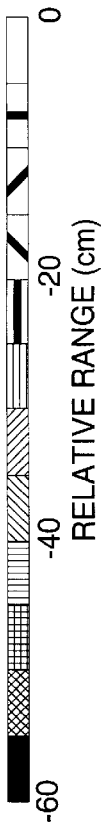
Figure 15A:
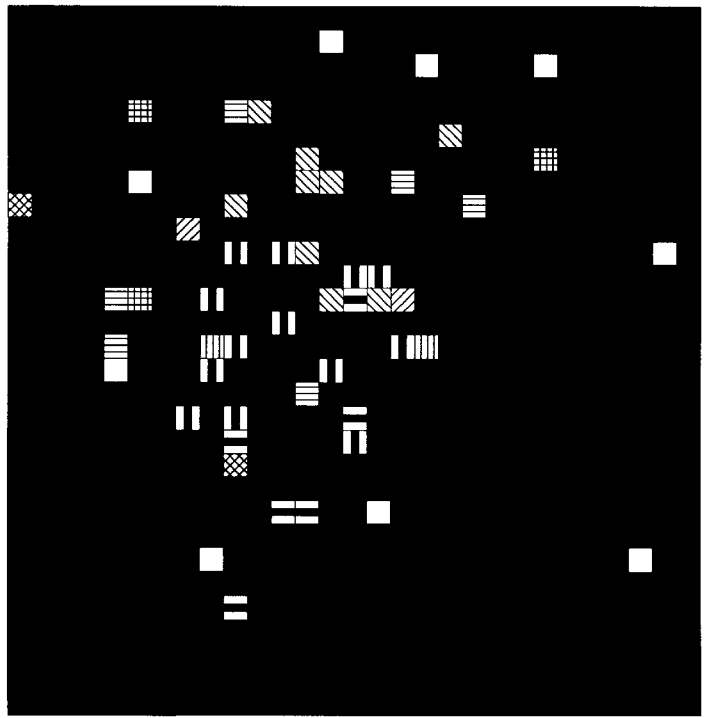
Figure 15A:
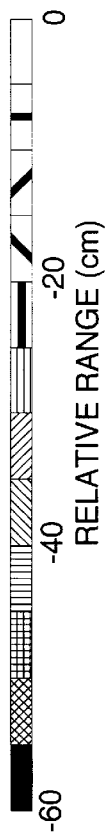
Figure 15D:
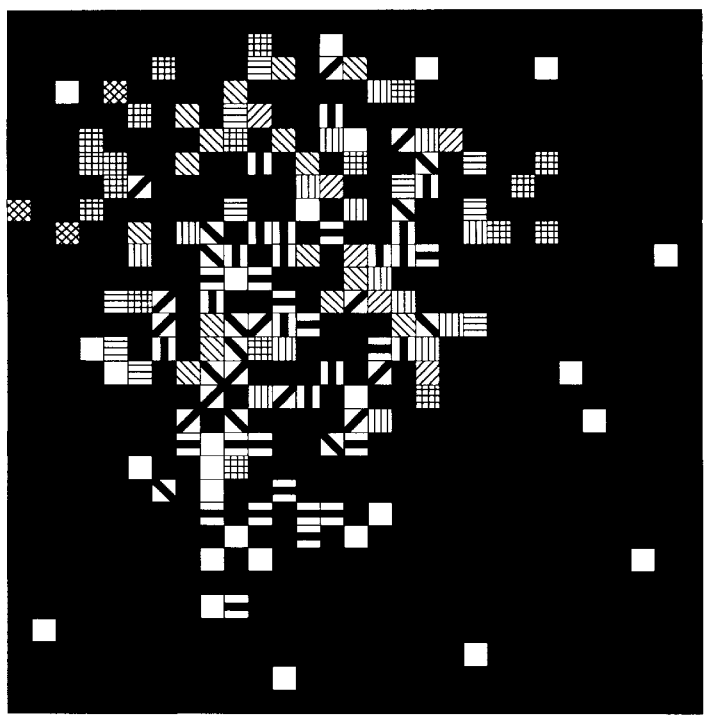
Figure 15D:
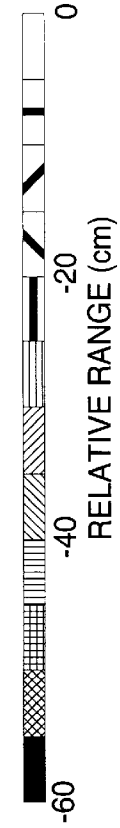
Figure 15C:
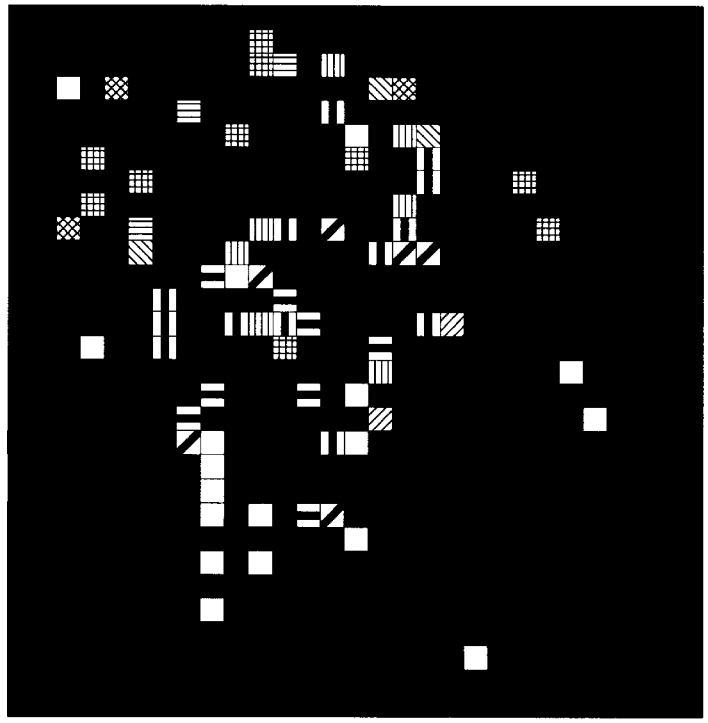
Figure 15C:
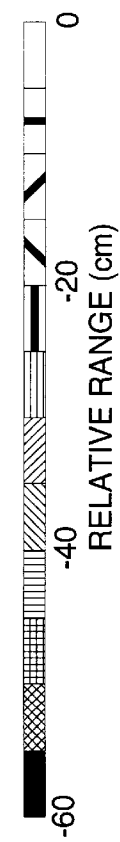
Figure 15F:
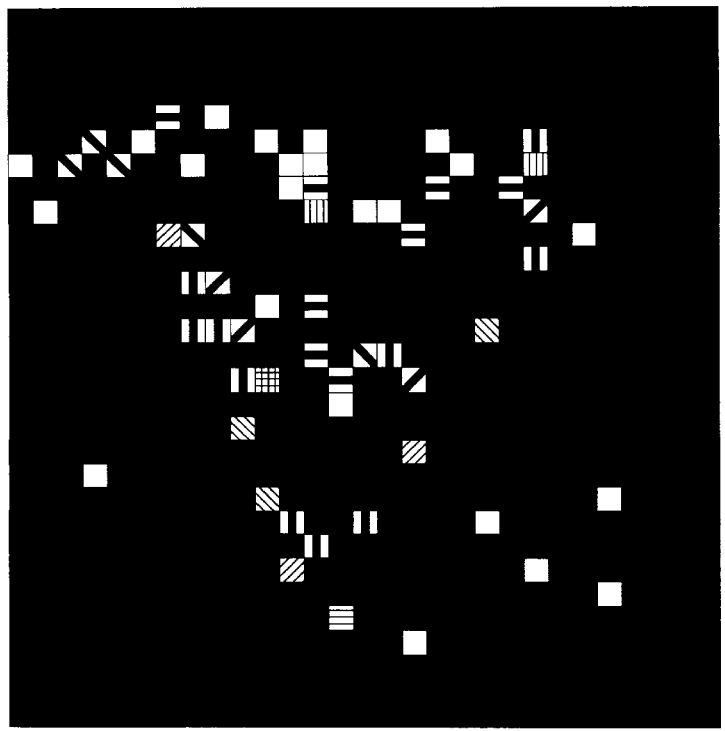
Figure 15F:
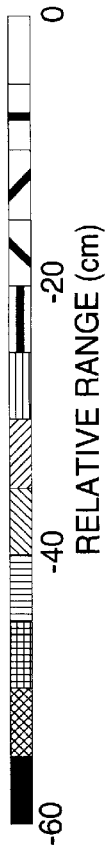
Figure 15E:
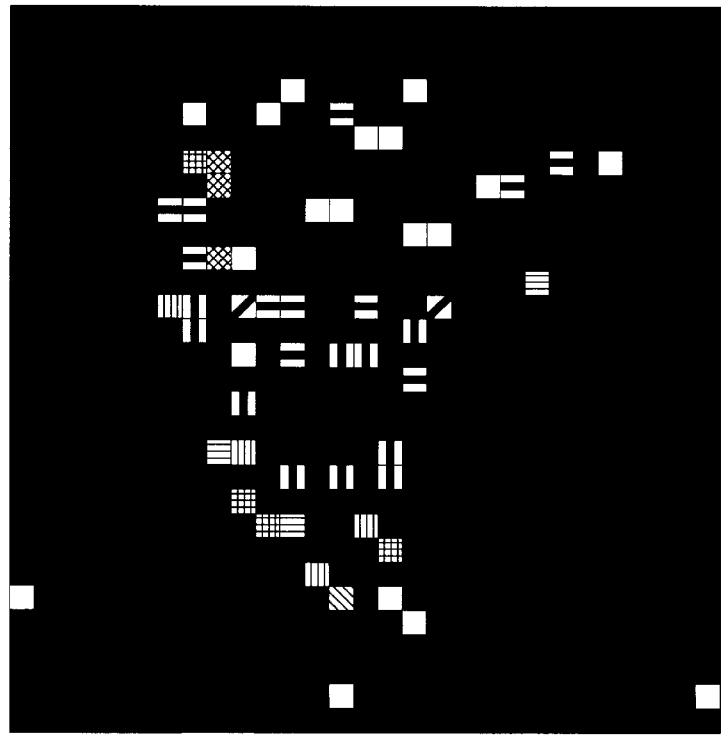
Figure 15E:
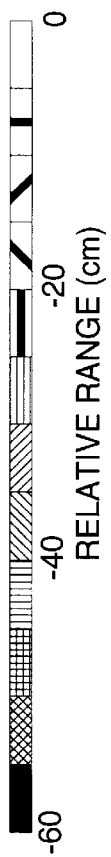
Figure 15H:
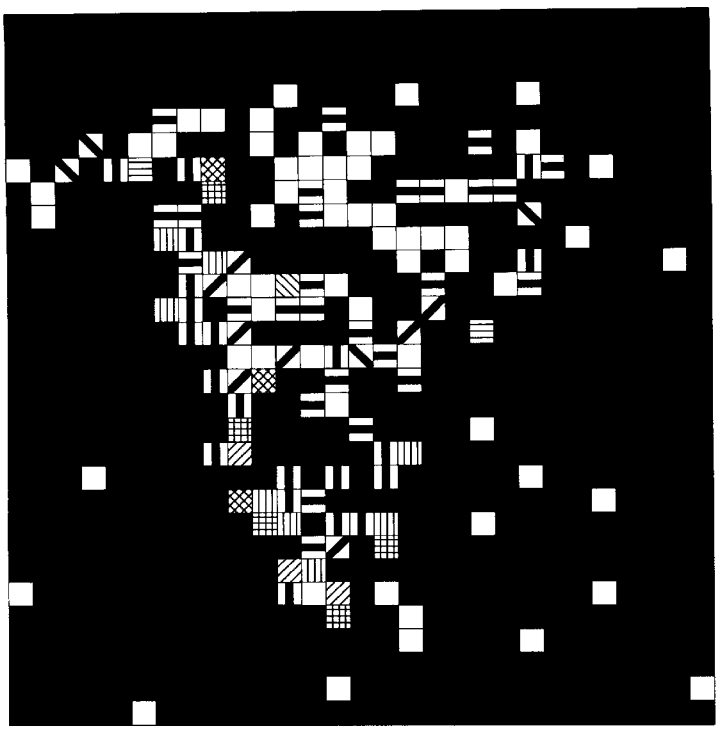
Figure 15H:
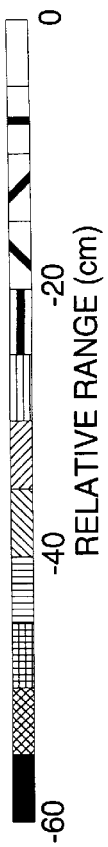
Figure 15G:
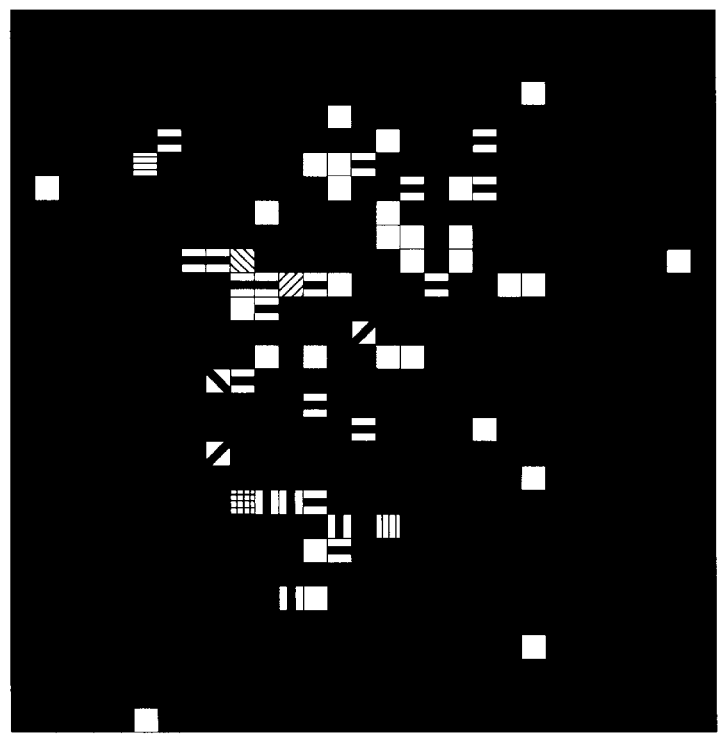
Figure 15G:
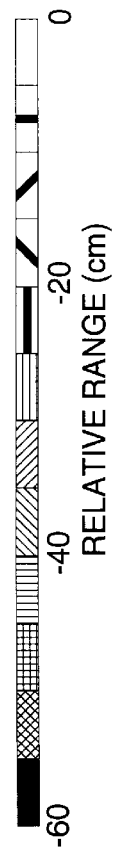

Reducing the transit beam attenuation by 20dB results in a detection rate of approximately 95%. As shown in FIG. 12, the ranging histogram fwhm is reduced to 240 ps (~4 cm) and has a more nearly Gaussian shape distribution. This is expected since the Geiger-mode detector is now triggering on the leading-edge of the photon-rich return pulse.

Angle-Angle-Range (3D) Resolved Imaging Examples:

Photon-counting 3D imaging was achieved with several single element detectors, i.e. commercial and custom APDs from EG&G, and from RMD.

FIG. 13 shows 3D images of a 50 cm diameter spherical weather balloon. The gray scale represents relative range: white is nearest to the sensor, darker is farther, and black represents no measurements within a range gate of 60 cm. Using Poisson detection statistics and a conservative 35% estimate for detection efficiency, the total number of photons received in these three images can be estimated as approximately 1594, 413, and 183 respectively. The observed detection probability, $P_d^{observed}$ is estimated as the fraction of angular pixels from the target which have a detection. The average number of photons per pixel, $\overline{N_{ph/pix}}$, is estimated by equating $P_d^{observed}$ to the probability of detecting one or more photoelectrons according to equation (2) below.

$$P_d^{poisson} = 1 - exp(-\eta_{qe} \overline{N_{ph/pix}}) \qquad (2)$$

FIG. 14 shows examples of angle-angle-range (3D) imaging of a paper cone (with a 52 cm diameter base and a height of 64 cm) at three aspect angles: near zero degrees (nose-on view), near 45, and near 90 degrees. Again, the gray scale represents relative range: white is nearest to the sensor, darker is farther, and black represents no measurements within the range gate of 60 cm. In FIG. 14, the right-most column of images result from combining the three single frame images on the left. The combined images result from an average of all non-zero range values in each pixel. The total number of photons received in each of the single frame images is less than 600.

FIG. 15 shows 3D images of the same cone at 45 and 90 degrees aspect angles with the flood-illuminated transmit beam intensity reduced by 5.0 dB. Again, the right most image results by averaging the non-zero pixel-by-pixel range measurements. The total number of received photons used in the combined images are estimated to be less than 600 and less than 450 for the 45 and 90 degrees aspect angles respectively.

Figure 16D:
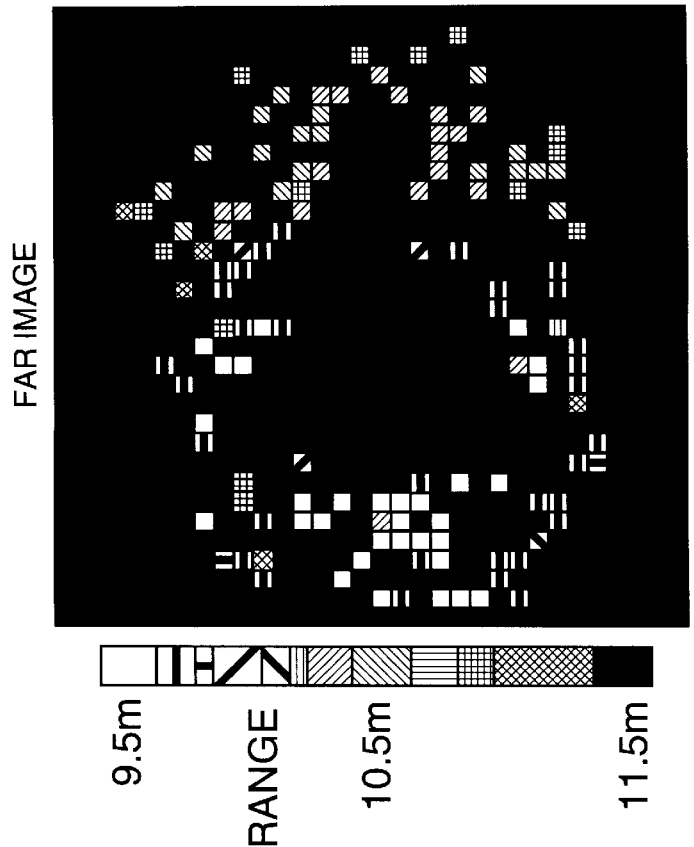
FIG. 16 is a pictorial view of 3D images of a paper cone and two spheres developed with an embodiment of a laser radar system according to the invention.
Figure 16C:
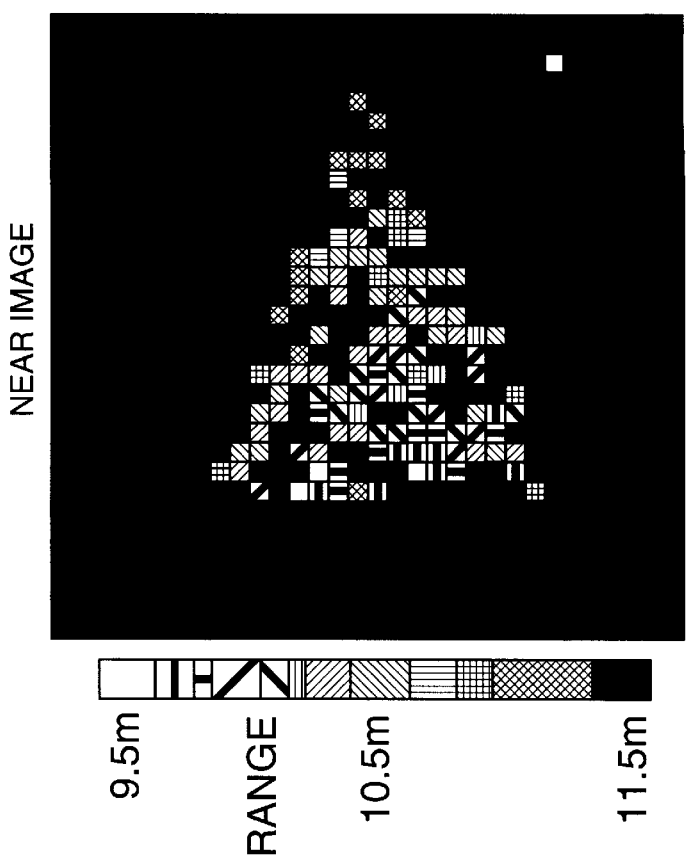
Figures 17A, 17B:
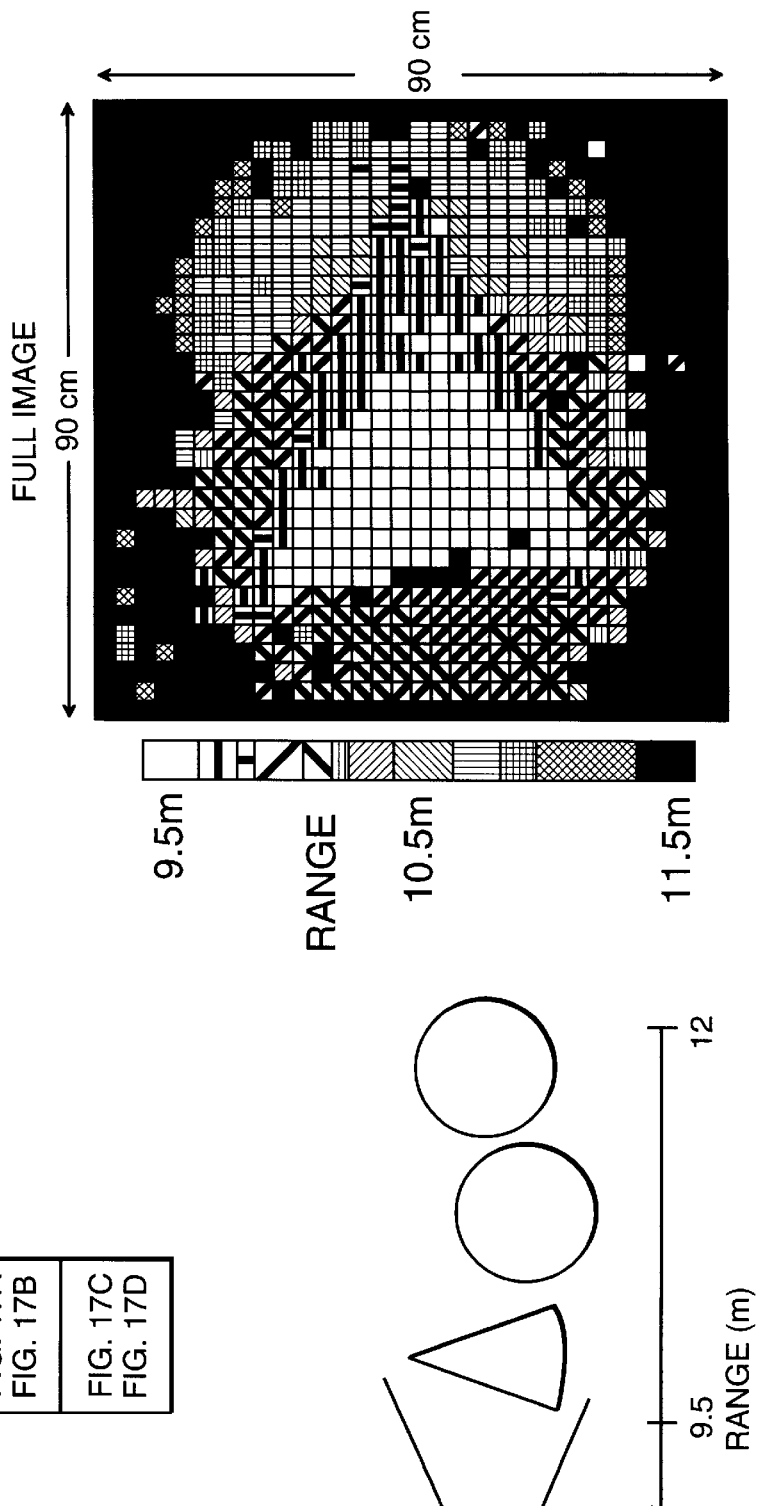
FIG. 17 is a pictorial view of 3D images of a paper cone and two spheres developed with an embodiment of a laser radar system according to the invention.
Figures 17C, 17D:
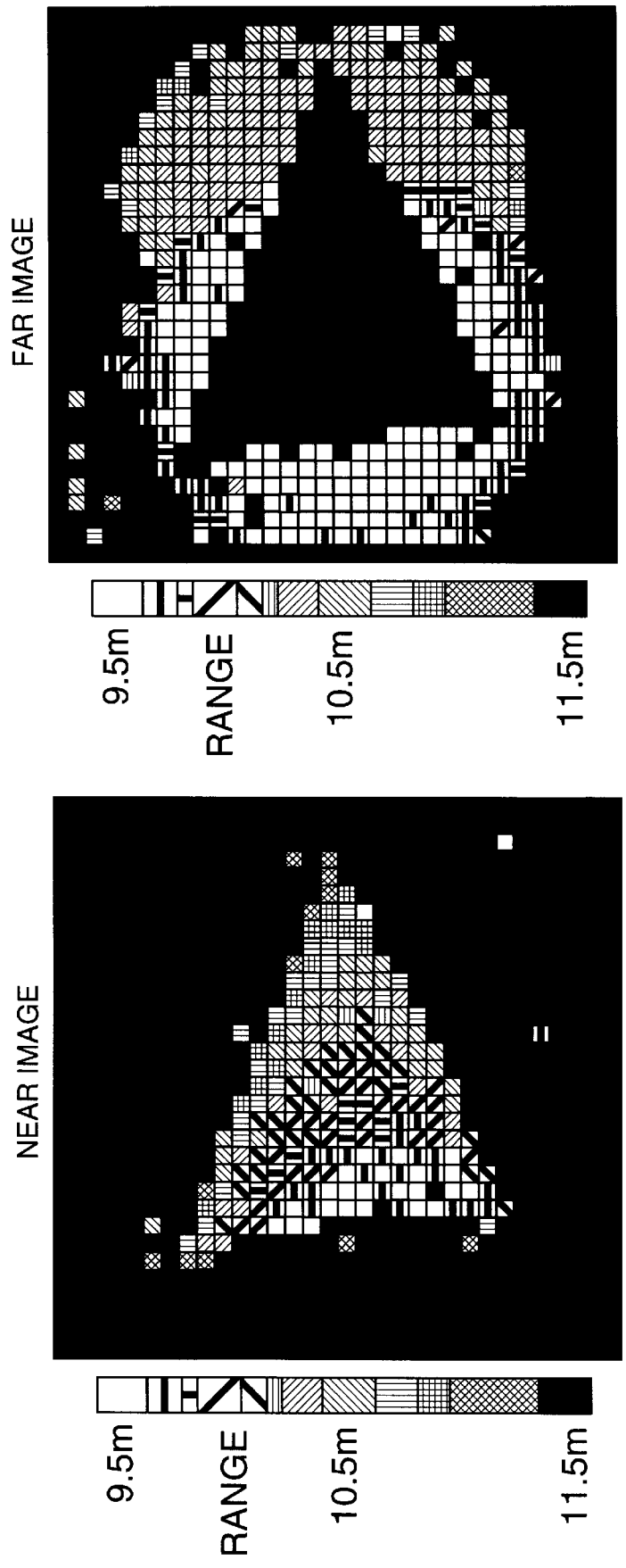
Figure 18B:
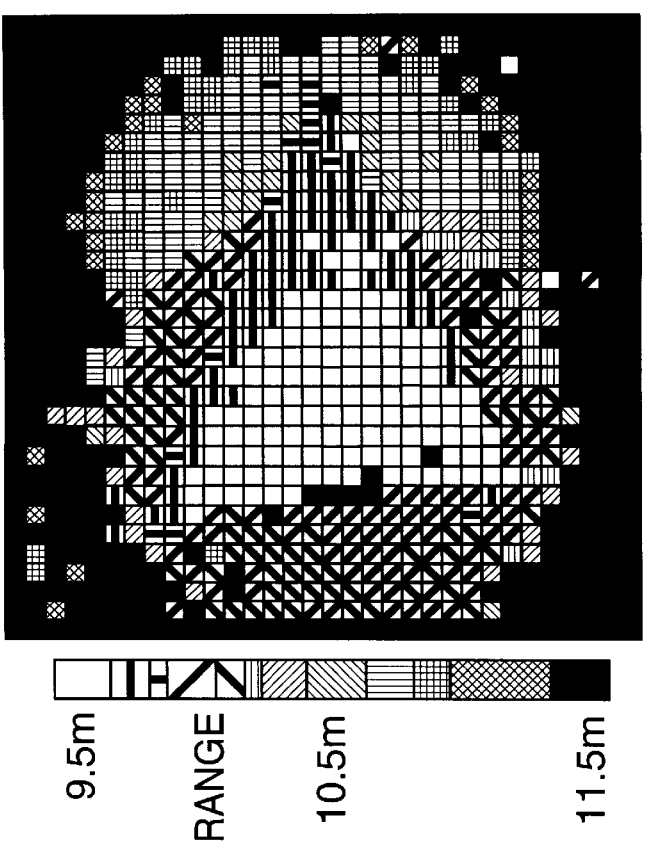
FIG. 18 is a pictorial view of two 3D images generated by an embodiment of a charge coupled device and two 3D images generated by an embodiment of a laser radar system according to the present invention.
Figure 18A:
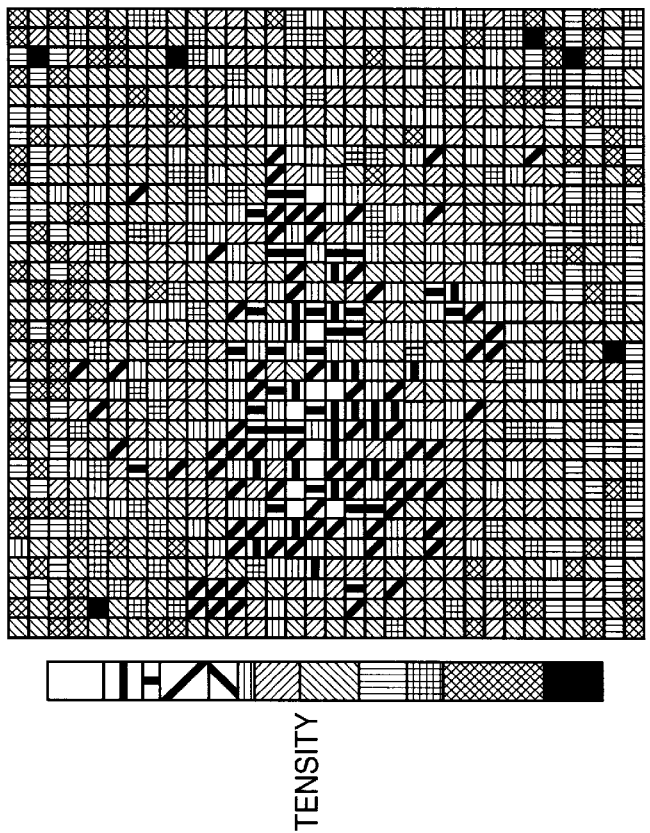
Figure 18D:
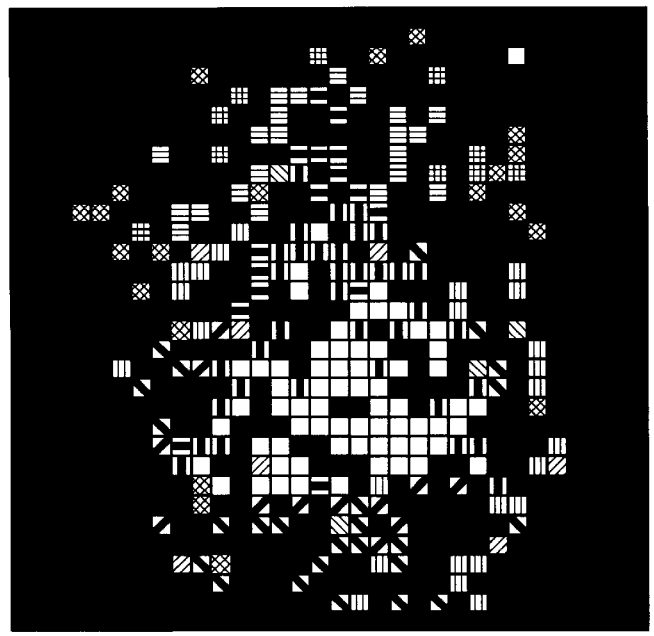
Figure 18D:
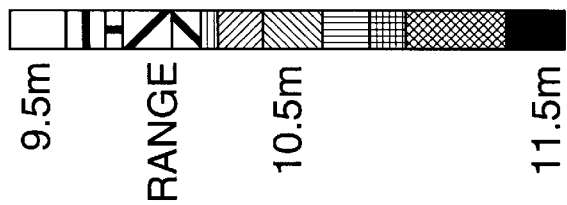
Figure 18C:
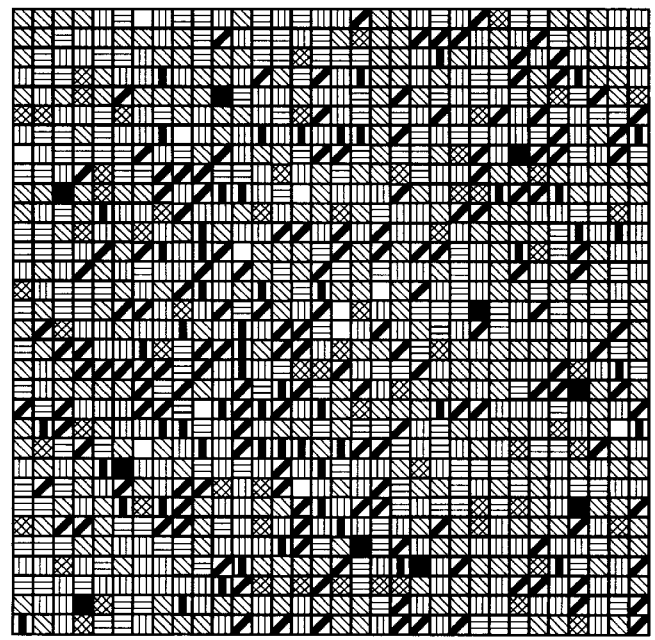
Figure 18C:
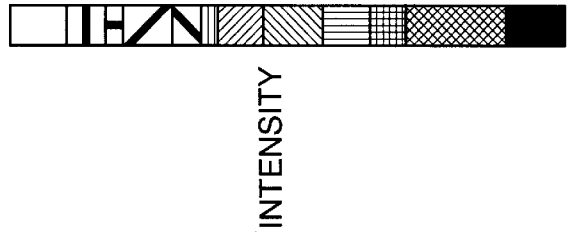

FIG. 16 shows the 3D images of a more complex target set consisting of a simple paper cone and two 50 cm diameter weather balloons. The paper cone had a 52 cm diameter base and a height of 64 cm. All three objects are within a range of 9.5 to 12 m from the sensor. The three images represent different range gates. The original scale represents relative range not intensity. The total number of signal photons is approximately 700 for the 9.5 to 11.5 m range-gated image. FIG. 17 shows the same target set but with 10 times more signal photons (roughly 7000 photons in total).

Comparison with a Low-noise Charge Coupled Device (CCD):

A set of images was recorded to use for direct comparison between the laser radar system of the present invention and the 2D (angle-angle) images from a good quality low-noise CCD. While the APD images were recorded with one flood-illuminating transmitted pulse per pixel, the CCD images were recorded with the integration of multiple laser pulses in an otherwise dark room. The CCD was attenuated using the ND filter in the transmit beam. The parameters describing the low noise CCD are listed in Table 3 below.

TABLE 3

CCD CAMERA PARAMETERS

STAR 1 Photometrics Camera with a Thomson CCD.
Operating Temp = −45° C.
Dark current = 7 e⁻/sec
All the pictures were taken at 4× gain for which the readout noise = 13 e⁻
Pixel Size - 23 microns squared
The quantum efficiency is ~0.30 at 532 nm.
Readout at 96 kHz per pixel at 12 bits/pixel.

In order to make a relative calibration between the APD and CCD images, the number of detected photons per pixel was estimated for each device according to equation (3) below, in which $\eta_{qe}$ is the effective detection efficiency, $L_\lambda$ is the spectral radiance (photons $s^{-1}m^{-2}sr^{-1}$), $\tau_\lambda$ and $\tau_0$ are the atmospheric and optical transmissivity (including any attenuation from ND filters), f/# is the f number of the imaging lens, and $A_p$ is the pixel area, and $\lambda$ is the wavelength of the light emitted by the laser(m).

$$Q_d = \frac{\eta_{qe}\pi A_d}{(1 + 4(f/\#)^2)} L_\lambda \lambda \tau_\lambda \tau_0 \tag{3}$$

To account for differing optics and $\eta_{qe}$, it is preferable to reduce the signal going to the CCD camera by ¾ for a fair comparison. However, the assumption was made that it is possible to obtain a quieter CCD camera (maybe 10e⁻ readout noise instead of 13e⁻). With the experimental setup, there is approximately a 1:1 comparison between the APD pixel signal and an almost ideal CCD pixel signal. The CCD array is much more dense, however, and the image subtends many more pixels than the APD array. Only every Nth CCD pixel was selected so that the sampled CCD image was 32×32, similar to the APD image. This relative comparison between APD and CCD is only a rough comparison and depends on assumptions about the characteristics of an ideal CCD imager and an ideal APD imager, but is probably good to a factor of two or so.

In order to estimate the number of signal photons involved, the number of detected photons for the APD image were calculated assuming Poissonian statistics. Then the assumption was made that a CCD and an APD have identical quantum efficiencies of about 0.5. For the actual measured data, probably more signal photons were present since the $\eta_{qe}$ may be less than 0.5, but with AR coating it certainly would be possible to achieve a $\eta_{qe}$ of 0.5 or higher.

The 3D images obtained can be compared to the angle—angle intensity (2D) images from the sparsely sampled CCD. FIG. 18 shows a set of four images. On the right, are the angle-angle-range resolved (3D) images of the cone and two spheres generated by an embodiment of a laser/radar system according to the present invention; the lower with approximately 700 total signal photons received, the upper with approximately 7000 total signal photons. On the left are the angle—angle intensity (2D) images from the low-noise CCD. The lower shows a direct comparison with roughly 7000 total signal photons received, the upper left shows the CCD image with ten times more signal intensity (~70,000 total signal photons received). Clearly, the imaging laser radar system using the Geiger-mode APD is not only much more sensitive than a high quality low-noise CCD, the additional range dimension promises to enable applications which require automatic target recognition.

The series of experiments evaluated three individual 20 μm diameter detector elements within two separate 4×4 Geiger-mode APD arrays, which were developed by RMD. The small size of the RMD detectors results in very fast response times (<200 ps), requires lower bias voltages (about 31 VDC), and allows for pixel-to-pixel separations which may account for low crosstalk observations. The effective fill factor can approach unity with the addition of microlens arrays.

The series of experiments demonstrated a proof-of-principal of a 3D imaging laser radar system with photon-counting sensitivity using a 2-axis scanner. The ranging precision of this laser radar system was measured to be less than 3 cm one sigma. The experimental setup was used to demonstrate 3D imaging with extreme sensitivity. The 3D spatial structure of macroscopic objects has been measured with, on average, less than one photon received per angle—angle pixel. The laser radar system according to the invention may be the most sensitive remote imaging sensor developed to date for any optical wavelength. The transmit power and receive aperture can be scaled-up for high-performance strategic, tactical, and commercial applications, including, but not limited to, long range automatic target/object recognition.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. An apparatus for measuring an object, comprising:
   a light source emitting pulses of light toward the object;
   a timing system in electrical communication with said light source; and
   a detector system in electrical communication with said timing system, said detector system further comprising:
   a monolithic array of light detectors operating in non-linear Geiger-mode; and
   an optical system collecting a portion of the light scattered off of the object and directing the collected light toward said array of light detectors.

2. The apparatus of claim 1 wherein said timing system measures a round-trip travel time for each pulse of light emitted by said light source.

3. The apparatus of claim 2 wherein said timing system outputs signals representing the round-trip travel time for each pulse of light, said apparatus further comprising:
   a processor in electrical communication with said detector system and said timing system, said processor receiving the signals representing the round-trip travel times of each pulse of light, determining a corresponding light detector detecting the pulse of light for each received signal and developing an image of the object in response to the received signals and corresponding light detectors.

4. The apparatus of claim 1 wherein each light detector in said monolithic array of light detectors comprises a single avalanche photodiode.

5. The apparatus of claim 1 wherein said light source is stationary.

6. The apparatus of claim 1 wherein said light source further comprises a laser.

7. The apparatus of claim 6 wherein said laser is a solid state Nd:YAG laser and wherein said laser emits light pulses, each light pulse having a wavelength of approximately 532 nanometers.

8. The apparatus of claim 6 wherein said light source further comprises a director disposed to intercept the light pulses emitted from said laser and to direct the light pulses toward the object.

9. The apparatus of claim 1 wherein said detector system is a scanning detector system and wherein said optical system scans the object.

10. A method for imaging a scene, comprising the steps of:
   (a) directing a light source toward a scene;
   (b) operating a monolithic array of light detectors in non-linear Geiger-mode;
   (c) directing a detector system comprising said monolithic array of light detectors toward the scene;
   (d) transmitting a pulse of light toward the scene;
   (e) detecting light reflected back from the scene using said array of light detectors;
   (f) determining a round-trip travel time of the pulse of light for each light detector in said array light detectors detecting the pulse of light;
   (g) recording positions of said light detectors in said array of light detectors detecting the pulse of light and corresponding travel times of the pulse of light; and
   (h) determining an image of the scene in response to recorded positions of said light detectors and corresponding round-trip travel times of the transmitted pulse of light.

11. An apparatus for measuring an object, comprising:
   a light source emitting pulses of light toward the object;
   a timing system in electrical communication with said light source; and
   a scanning detector system in electrical communication with said timing system, said scanning detector system further comprising:
      a light detector operating in non-linear Geiger-mode; and
      an optical system scanning the object, collecting a portion of the light scattered off of the object and directing the collected light toward said light detector.

12. The apparatus of claim 11 wherein said timing system measures a round-trip travel time for each pulse of light emitted by said light source.

13. The apparatus of claim 12 wherein said timing system outputs signals representing the round-trip travel time for each pulse of light, said apparatus further comprising:
   a processor in electrical communication with said scanning detector system and said timing system, said processor receiving the signals representing the round-trip travel times of each pulse of light, determining a corresponding angular position of said optical system for each received signal and developing an image of the object in response to the received signals and corresponding angular positions of said optical system.

14. The apparatus of claim 11 wherein said light detector comprises a single avalanche photodiode.

15. The apparatus of claim 11 wherein said light source is stationary.

16. The apparatus of claim 11 wherein said light source further comprises a laser.

17. The apparatus of claim 16 wherein said laser is a solid state Nd:YAG laser and wherein said laser emits light pulses, each light pulse having a wavelength of approximately 532 nanometers.

18. The apparatus of claim 16 wherein said light source further comprises a director disposed to intercept the light pulses emitted from said laser and to direct the light pulses toward the object.

19. The apparatus of claim 11 wherein said optical system raster scans the object.

20. The apparatus of claim 11 wherein said optical scanning system further comprises:
   a first scanning mirror; and
   a motor mechanically coupled to said first scanning mirror, said motor directing said first scanning mirror along a first raster scanning path.

21. The apparatus of claim 20, further comprising:
   a second scanning mirror, wherein said motor is mechanically coupled to said second scanning mirror and directs said second scanning mirror along a second raster scanning path perpendicular to said first raster scanning path.

22. An apparatus for measuring an object, comprising:
   a light source emitting pulses of light toward the object;
   a timing system in electrical communication with said light source; and
   a detector system in electrical communication with said timing system, said detector system further comprising:
      a light detector; and
      an optical system scanning the object, collecting a portion of the light scattered off of the object and directing the collected light toward said light detector,
      wherein said light detector consists of a single solid state nonlinear light detector operating in the Geiger-mode.

23. A method for imaging a scene, comprising the steps of:
   (a) directing a light source toward a scene comprising a plurality of points;
   (b) operating a light detector in non-linear Geiger-mode;
   (c) directing a detector system comprising said light detector toward a point in the scene;
   (d) transmitting a pulse of light toward the scene;
   (e) detecting light reflected back from the point using said light detector;
   (f) determining a round-trip travel time of the pulse of light;
   (g) recording a position of said detector system and said travel time of the pulse of light;
   (h) repeating steps (c)–(g) for each of said plurality of points; and
   (i) determining an image of the scene in response to recorded positions of said detector system and corresponding round-trip travel times of each of the transmitted pulses of light.

* * * * *